(12) United States Patent
Nakai et al.

(10) Patent No.: US 6,552,818 B1
(45) Date of Patent: Apr. 22, 2003

(54) IMAGE OUTPUT PROCESSING APPARATUS

(75) Inventors: Yasuhiro Nakai, Soraku-gun (JP); Masakatsu Nakamura, Kashihara (JP); Syoichiro Yoshiura, Tenri (JP); Hiroshi Maeda, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/438,465

(22) Filed: Nov. 12, 1999

(30) Foreign Application Priority Data

Nov. 13, 1998 (JP) .......................................... 10-324010

(51) Int. Cl.[7] .............................................. G06K 15/00
(52) U.S. Cl. ........................ 358/1.16; 358/444; 358/404
(58) Field of Search ................................. 358/404, 444, 358/1.16, 1.17

(56) References Cited

U.S. PATENT DOCUMENTS 5,446,803 A * 8/1995 Kunitake ..................... 382/290
5,959,675 A * 9/1999 Mita ........................... 348/405

FOREIGN PATENT DOCUMENTS

EP 1001602 A2 * 5/2000 ............ H04N/1/32
JP 2000-141787 * 5/2000 ............. B41J/5/30

* cited by examiner

Primary Examiner—Jerome Grant, II
(74) Attorney, Agent, or Firm—Dike, Bronstein, Roberts & Cushman; Edwards & Angell; Dike G. Conlin

(57) ABSTRACT

An image output processing apparatus, which temporarily stores inputted image data and thereafter reads out the same to output images on sheets of paper, includes a CPU which (i) divides inputted image data into a plurality of blocks under predetermined conditions in an order in which the image data are inputted, so that one block has an amount of image data not exceeding a capacity of the storing means, (ii) when the storing of image data of one block in the storing means is finished, reads out the temporarily stored image data from the storing means, outputs the image data of the block so that a set number of copies of the images are obtained, and makes the storing means free, and (iii) thereafter stores image data of a next block into the storing means and applies to the image data the same processing operation as that described above.

21 Claims, 34 Drawing Sheets

FIG. 15
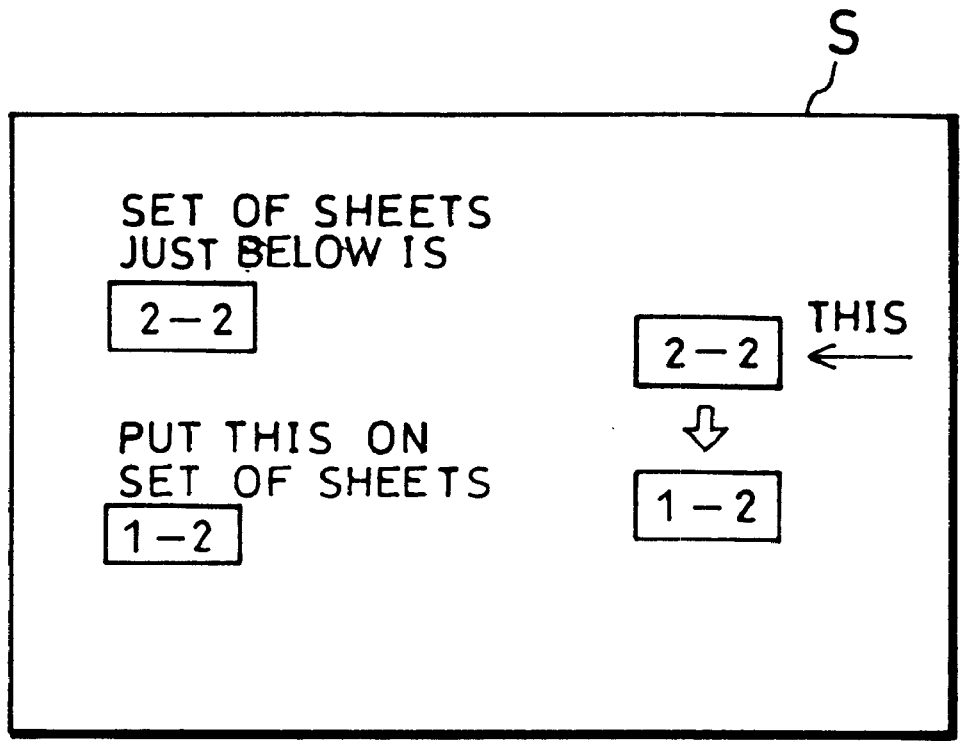
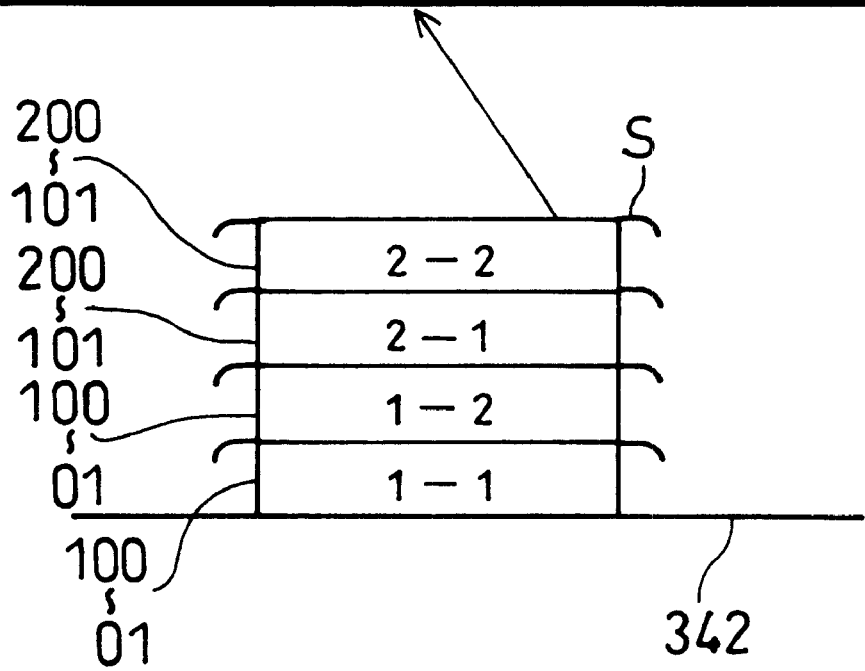

FIG.20

HISTORY INFORMATION MANAGEMENT TABLE

| MANAGEMENT No. | DATE | AMOUNT OF DATA |
|---|---|---|
| 001 | 1998.09.16  14:25 | ○○○KB |
| 002 | 1998.09.16  15:52 | ×××KB |
| 003 | 1998.09.16  16:46 | □□□KB |

FIG. 25

IMAGE ID MANAGEMENT TABLE
SHEET ID, BACK/FRONT IMAGE ID

| | |
|---|---|
| 1 | 50 |
| | 49 |
| 2 | 48 |
| | 47 |
| | |
| | |

READ-IN IMAGE ID

SHEET TRANSPORT IN INTERMEDIATE TRAY TYPE
MOVE OF SHEET BEFORE PILED IN INTERMEDIATE TRAY (SHINGLE SHEET TRANSPORTED)
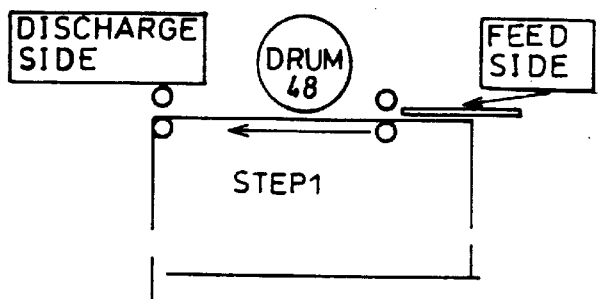
FIG.26(a) STEP1
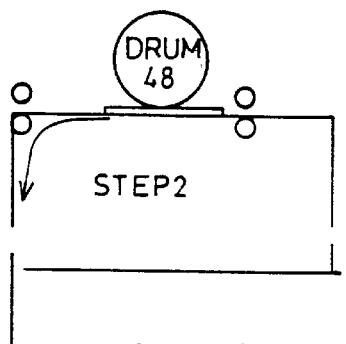
FIG.26(b) STEP2
FIG.26(c) STEP3
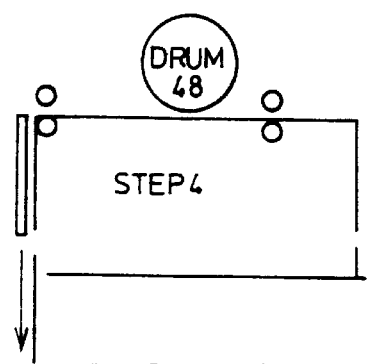
FIG.26(d) STEP4
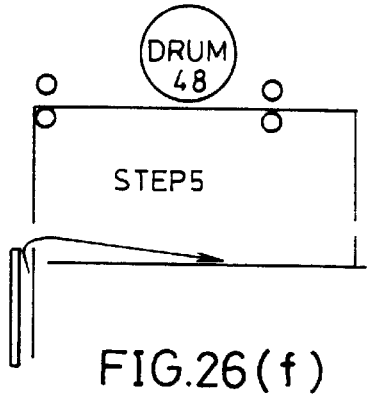
FIG.26(e) STEP5
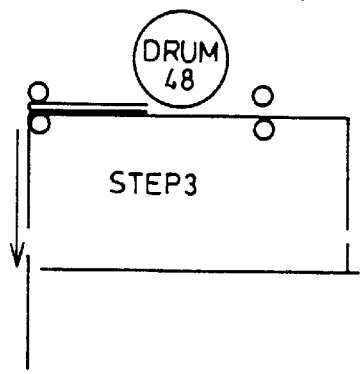
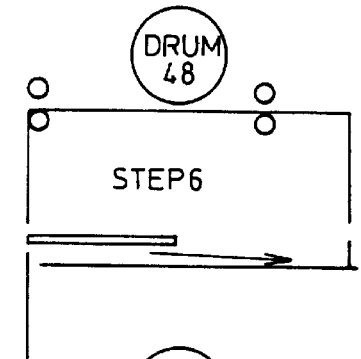
FIG.26(f) STEP6
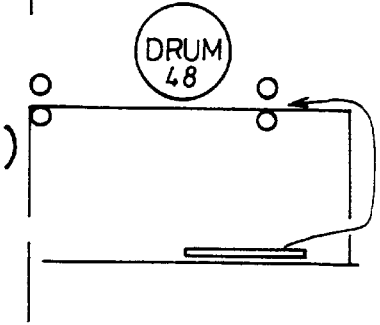
FIG.26(g)

SHEET TRANSPORT IN INTERMEDIATE TRAY TYPE
MOVE OF SHEET BEFORE PILED IN INTERMEDIATE TRAY (PLURAL SHEETS TRANSPORTED)

SHEET TRANSPORT PATH TYPE (LOOP DUPLEX)

STEP 1

STEP 2

STEP 3

STEP 4

STEP 5

STEP 6

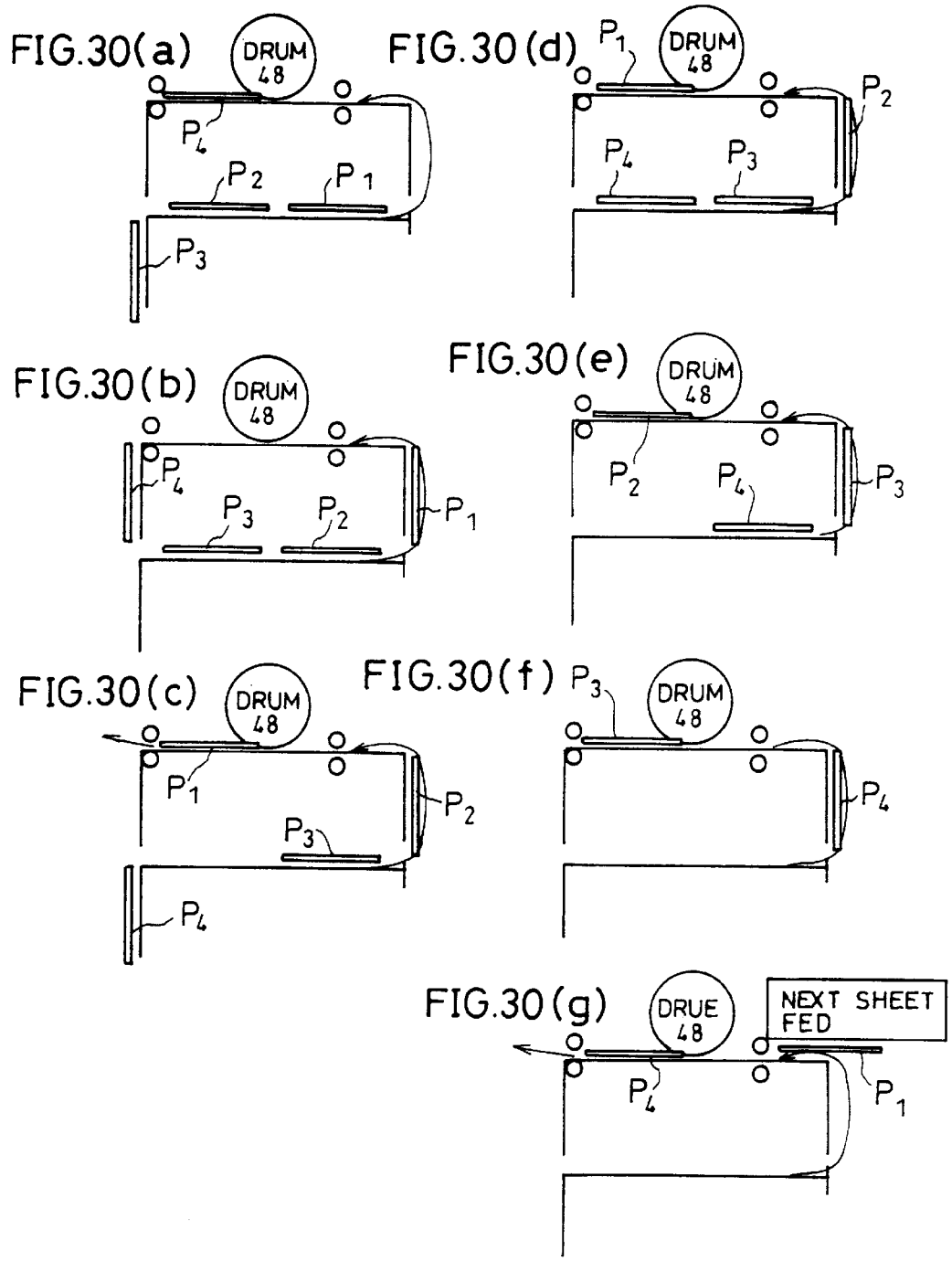

LIMIT OF SHEETS TREATED: LIMIT IN STAPLING

STEP1

STEP2

STEP3

STEP4

STEP5

STEP6

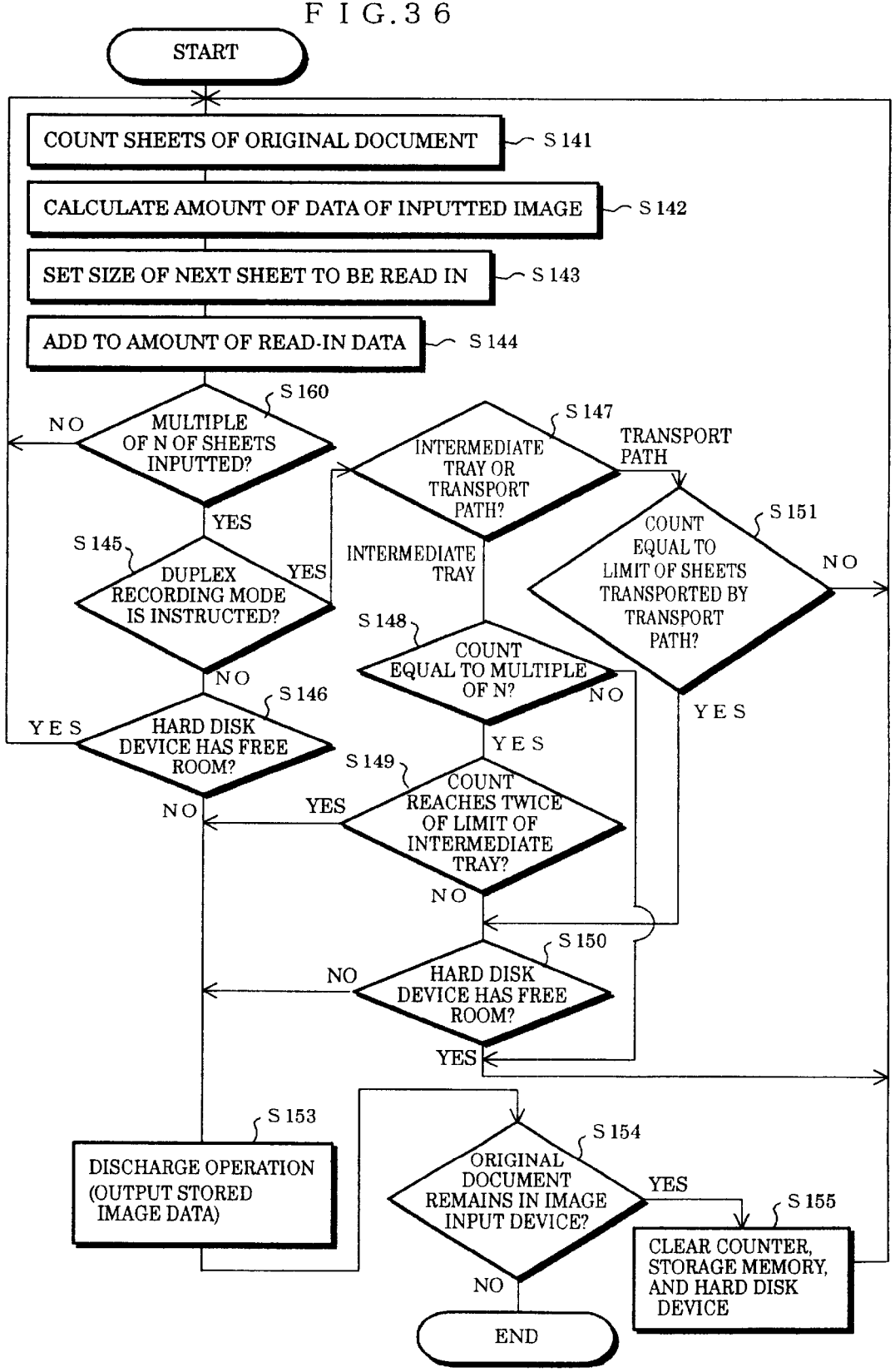

IMAGE OUTPUT PROCESSING APPARATUS

FIELD OF THE INVENTION

The present invention relates to an image output processing apparatus which is equipped with storing means such as a hard disk device and is capable of temporarily storing image data supplied thereto in the storing means and reading out the same so as to output images.

BACKGROUND OF THE INVENTION

Apparatuses that electronically read in images, apply predetermined processing to the electronic image data thus read in, and then carry out optical scanning recording at electrophotographic recording sections so that images are recorded/reproduced have been put on the market as digital copying machines, for example.

Recently also marketed are copying machines which store read-in data in semiconductor memories and improve values of products thereof by adding characteristics unique to digital processing to electronically read image data.

In the digital copying machine market, such copying machines have been proposed as systems capable of efficiently processing massive documents with increased capacity of semiconductor memories, or as complex digital machines in which functions of a facsimile, a printer, etc., are integrated.

To use such a digital copying machine to input massive document through a scanner section and process the same at once, or to receive and process massive document data produced by a personal computer or the like in a networked environment, the digital copying machine may be incapable of processing such input in some cases since the semiconductor memory installed therein has only a limited capacity of processing data at once.

To cope with this, recently has been devised installation of an external memory device with a large capacity, such as a hard disk device, so that the device works either by itself or along with a semiconductor memory to process image data of greater volume at once.

Volume of image data, however, varies depending on a type of vocation of the user, environment, etc., and particularly in there days, since the digital copying machine is inherently required to process image data of high resolution such as high-quality images or color images, a set of image data per se is enormous. Therefore, installation of a hard disk device does not always allow the digital copying machine to completely meet demands of all users.

On the other hand, the Japanese Publication of Laid-Open Patent Application No. 27881/1997 (Tokukaihei 9-27881, Date of Publication: Jan. 28, 1997) discloses a processing method including the following steps: when a hard disk device receives image data transferred from a personal computer to its full capacity, temporarily stopping data transfer from the personal computer and outputting images based on image data stored in the hard disk device; and after outputting all the image data stored in the hard disk device, resuming the transfer of image data from the personal computer and outputting the same in the same manner as above.

The digital complex image recording apparatus disclosed by the foregoing publication is arranged so as to, during the foregoing outputting operation, operate an offset tray in a discharge section at a stage where the image output based on the image data stored in the hard disk device is completed, in order that the foregoing output is clearly distinguished from output of image data to be subsequently stored in the hard disk device.

This ensures identification of a portion in the hard disk device where an error occurs due to over-capacity, and allows the user to easily check whether or not an image corresponding to the error portion is adequately outputted.

Although, however, the publication teaches that the digital complex image recording device taught therein outputs image data stored in the hard disk device when the hard disk device becomes full and thereafter resumes data transfer, only discharge of the copies with use of a sorter is described therein regarding cases where output of a plurality of copies is instructed. A sorter, though being a convenient device, is bulky and unavoidably causes a rise of costs of the entire apparatus.

Furthermore, since use of a sorter makes an editing operation unnecessary even if image data are divided into a plurality of blocks and outputted, the publication teaches nothing about how to obtain a plurality of copies of a document without use of a sorter, from image data divided into blocks.

Further, in the case where image data are divided into blocks according to the capacity of storing means, sometimes occurs an inconvenience such that one side of a sheet of paper corresponding to a border between blocks becomes blank depending on output conditions of a duplex recording mode, but the foregoing publication only teaches that image data are divided into blocks according to the capacity of storing means, proposing no means to avoid such an inconvenience.

SUMMARY OF THE INVENTION

A first object of the present invention is to provide an image output processing apparatus which is capable of easily providing a plurality of copies of an original document without a sorter function in the case where due to over-capacity of a hard disk device image data are divided into a plurality of blocks thereby causing images to be outputted in blocks.

To achieve the foregoing object, an image output processing apparatus of the present invention, which temporarily stores inputted image data and thereafter reads out the same so as to output images on sheets of paper, includes (a) storing means for storing image data, and (b) image output controlling means, which (i) divides inputted image data into a plurality of blocks under predetermined conditions in an order in which the image data are inputted so that one block has an amount of image data not exceeding a capacity of the storing means, (ii) when the storing of image data of one block in the storing means is finished, reads out the temporarily stored image data from the storing means, outputs the image data of the block so that a set number of copies of the images are obtained, and makes the storing means free, and (iii) thereafter stores image data of a next block into the storing means and applies to the image data the same processing operation as that described above.

According to the foregoing arrangement, in the case where massive image data are transferred from a networked personal computer or the like or in the case where a massive document is set in an automatic document reading device (image input device), image data can be divided into blocks under predetermined conditions in an order in which the image data are inputted, and image data of each block are outputted so that a desired number of copies of the document are obtained.

The foregoing arrangement wherein inputted data are divided into blocks according to a capacity of storing means enables output of image data for required plural copies even when an amount of inputted image data exceeds the capacity of the storing means, and required plural copies of the document can be surely obtained with a subsequent editing operation, without a sorting function.

A second object of the present invention is to provide an image output processing apparatus which ensures a simpler editing operation applied to output of the apparatus in the form of a plurality of sheets of paper, thereby to further reduces burden on a user.

To achieve the foregoing object, the aforementioned image output processing apparatus further includes editing information outputting means for outputting editing information used for finishing discharged sheets of paper divided in groups into complete copies are outputted.

With the foregoing arrangement, when images are outputted by dividing image data into blocks, the editing information outputting means outputs editing information for finishing the discharged sheets of paper divided in groups into complete copies, and the user only has to rearrange the groups of discharged sheets of paper in accordance with the outputted editing information. By so doing, the user can easily and speedily finish the editing work.

The foregoing editing information outputting means is preferably arranged so as to provide editing information in a manner instructed by the user.

With this arrangement, the user is allowed to instruct the manner of providing the editing information, and the editing information outputting means provides the editing information in the manner thus instructed. Therefore, in the case where the user works on editing at a distance from the image outputting processing apparatus, the user may instruct the editing information provision by printing out. On the other hand, in the case where the user can quickly carry out the editing beside the image output processing apparatus, the editing information may be displayed on the display section of the image output processing apparatus, so that paper and toner are not wasted.

The foregoing editing information outputting means preferably has editing information at various levels, and provides editing information at a level instructed by the user.

With the foregoing arrangement, the user is allowed to instruct the level of editing information to be provided, and the editing information output means provides editing information at the instructed level. Therefore, it is possible to provide editing information suitable to the level of the user's skill of editing work, for example, detailed editing information for a user not accustomed to an editing work, while simplified editing information for a user accustomed to an editing work.

The foregoing editing information outputting means preferably suspends output of editing information in response to an instruction by the user for non-necessity of output of editing information.

With the foregoing arrangement, the user is allowed to instruct necessity/non-necessity of output of editing information. Therefore, the user well versed in the editing work may instruct non-necessity of output of editing information, so as to avoid such bother as display of editing information every time or request to the user for instruction of the displaying manner.

The foregoing editing information outputting means preferably outputs editing information on a sheet of distinction paper at a position such that an image of the editing information is not hidden under sheets of paper subsequently piled on the sheet of distinction paper.

Since the foregoing arrangement ensures that the image of the editing information is outputted at a position such that it is not hidden under sheets of paper subsequently piled on the sheet of distinction paper, it is possible to check the editing information before starting to edit the sets of sheets, allowing a user unaccustomed to such editing works to work at ease.

Furthermore, the foregoing editing information outputting means is preferably arranged so that, in the case where the sheets of paper are discharged in a face-down state in which the sheets of paper are piled with image-recorded surfaces of the sheets of paper facing downward, the editing information outputting means outputs editing information on both surfaces of the sheet of distinction paper so that the surfaces have respective editing information suited with respective states of the sheets of paper during an editing operation.

The sheets of paper discharged in the face-down state are, since blank surfaces thereof face upward, sometimes turned over so that image-recorded surfaces face upward. Therefore, by causing the image output processing apparatus to output editing information on both surfaces of the sheet of distinction paper so that the surfaces have respective editing information suited with respective states of the sheets of paper during an editing operation, the person engaged in the editing work can carry out the editing work without difficulty, if the pile of sheets of paper is turned over.

A third object of the present invention is to provide an image output processing apparatus which in an innovative manner provides borders between blocks of image data so as to output in accord with instructed output conditions of outputted images such as a duplex recording mode, even in the case where image data are divided into blocks.

To achieve the foregoing object, in the case where output conditions for output images are instructed, the foregoing image output controlling means divides the image data into blocks in accordance with the conditions.

With the foregoing arrangement wherein, in division of inputted image data into blocks, borders between blocks are determined not only according to the capacity of the storing means but also according to the conditions for output of images, copies of a document in accord with the output conditions can be obtained as a result of the editing work.

In the case where a duplex recording mode is instructed as output conditions, in the foregoing arrangement, the image data are preferably divided into blocks so that image data to be recorded on a front surface and a back surface of a same sheet of paper are not separately allocated to different blocks.

With the foregoing arrangement wherein, in the case of the duplex recording mode, the image data to be recorded on a front surface and a back surface of the same sheet of paper are not separately allocated to different blocks, hardly occurs such a defect that one surface of a sheet of paper on a border between blocks becomes blank. Accordingly, copies of a document can be obtained in the double-sided form without problems from image data divided into a plurality of blocks.

Furthermore, in the foregoing arrangement, in the case where, in the duplex recording mode, sheets of paper having images recorded on first surfaces thereof are temporarily held in an intermediate tray, the image data are preferably divided into blocks so that one block contains image data equivalent to twice a maximum number of sheets of paper loaded on the intermediate tray.

With the foregoing arrangement wherein the image data are divided into blocks so that one block contains image data equivalent to twice a maximum number of sheets of paper loaded on the intermediate tray, copies of a document can be obtained in the double-sided form without problems from image data divided into a plurality of blocks, in the duplex recording operation with use of the duplex unit of the intermediate tray type.

Furthermore, in the foregoing arrangement, in the case where, in the duplex recording mode, to form images on second surfaces of the sheets of paper which have images on first surfaces thereof, the sheets of paper are not piled but are recirculated with a predetermined number of sheets of paper being treated as one transport unit, the image data are preferably divided into blocks so that one block contains image data equivalent to twice the transport unit, the predetermined number depending on a length of a transport path and a size of the paper.

With the foregoing arrangement wherein the image data are divided into blocks so that one block contains image data equivalent to twice the transport unit, copies of a document can be obtained in the double-sided form without problems from image data divided into a plurality of blocks, in the duplex recording operation with use of the duplex unit of a recirculation type which does not use the intermediate tray.

For a fuller understanding of the nature and advantages of the invention, reference should be made to the ensuing detailed description taken in conjunction with the accompanying drawings.

BRIEF DESCRIPTION OF THE DRAWINGS

FIG. 15 is an explanatory view illustrating another state of editing information printed on a distinction sheet.

FIG. 20 is an explanatory view illustrating a management table for managing history information in the case where image data are divided into blocks and processed, in a digital copying machine as an example of an image output processing apparatus in accordance with still another embodiment of the present invention.

FIG. 25 is an explanatory view illustrating an image ID management table of an image processing section.

FIGS. 26(a) through 26(g) are views showing transport of a single sheet in the case of the duplex unit of the intermediate tray type.

FIGS. 30(a) through 30(g) are views showing an image processing operation continued from the image processing operation shown in FIG. 29(f).

FIG. 36 is a flowchart of a judging operation in the plural-block split processing in the case where the N-in-1 mode is instructed.

DESCRIPTION OF THE PREFERRED EMBODIMENTS

[First Embodiment]

The following description will explain an embodiment of the present invention while referring to FIGS. 1 through 11.

An embodiment of an image output processing apparatus in accordance with the present invention is explained below by taking as an example a digital copying machine which is connected with an external information processing device such as a personal computer through network, or with a digital video camera, a facsimile machine, etc.

Figure 3:
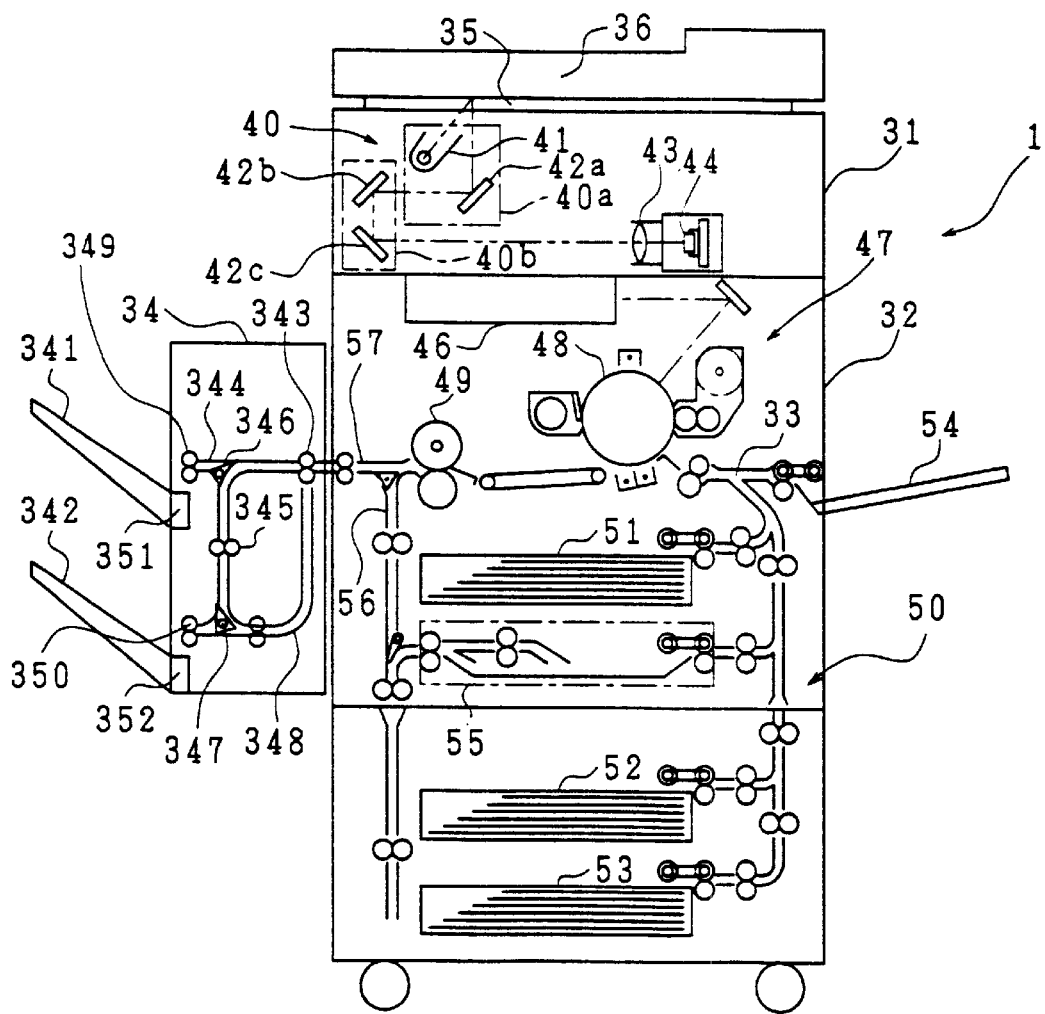
FIG. 3 is a cross-sectional view illustrating a structure of the foregoing digital copying machine.

FIG. 3 is a cross-sectional view illustrating an entire structure of the digital copying machine 1. As shown in this figure, the digital copying machine 1 is roughly composed of a scanner section 31 and a laser recording section 32.

The scanner section 31 is composed of a original document platen 35 made of transparent glass, a recirculating automatic document feeder (RADF) 36 for automatically feeding an original document onto the original document platen 35, and an original document read-in unit for scanning and reading in an image on the original document placed on the original document platen 35, that is, a scanner unit 40.

An original document image read in by the scanner section 31 is sent to an image data input section which will be described later, in a form of image data, to which a predetermined image processing is applied.

The RADF 36 is a device for feeding a document which is composed of a plurality of sheets of paper and set on a predetermined original document tray, sheet by sheet onto the original document platen 35 of the scanner section 31 automatically. The RADF 36 is composed of a transport path for a one-sided document, a transport path for a double-sided document, transport path switching means, etc., so as to make the scanner unit 40 read in either surfaces on one side of the document or surfaces on both sides of the document according to selection of an operator. Incidentally, detailed description of the RADF 36 is omitted herein since many patent applications and commercialization of the same have been made.

The scanner unit 40 is composed of a lamp reflector assembly 41, a first scanning unit 40a, a second scanning unit 40b, an optical lens body 43, and a photoelectric converting element 44. The lamp reflector assembly 41 is designed to irradiate a surface of an original document. The first scanning unit 40a is composed of a first reflection mirror 42a which are designed to guide a reflected-light image of the original document to the photoelectric converting element 44. The second scanning unit 40b is composed of second and third reflection mirrors 42b and 42c which are designed to guide the reflected-light image of the original document to the photoelectric converting element 44. The optical lens body 43 is designed to create an image on the photoelectric converting element 44 which converts the reflected-light image of the original document into electric image signals. The photoelectric converting element 44 is composed of a CCD or the like which converts the reflected-light image from the original document into electric image signals.

The scanner section 31 is arranged so as to read the original document image with use of the RADF 36 and scanner unit 40 which act in an associated manner wherein an original document to be read is placed on the original document platen 35 sheet by sheet while the scanner unit 40 is moved along a lower surface of the original document platen 35.

Image data obtained by reading the original document image by use of the scanner unit 40 are sent to an image processing section which will be described afterwards, and are supplied to a laser scanning unit (hereinafter referred to as LSU) 46 of the laser recording section 32.

The laser recording section 32 is equipped with a sheet housing and transporting section, the LSU 46, and an electrophotographic processing unit 47 for forming an image.

The sheet housing and transporting section has a first cassette 51, a second cassette 52, a third cassette 53, and a multiple hand-feed tray 54, and further, a duplex unit 55 for recording an image on a back surface of a sheet on whose front surface an image has already been recorded.

Each of the foregoing cassettes of the sheet housing and transporting section houses sheets of recording paper according to a size, and upon selection of a cassette housing sheets in a size desired by the operator, the sheets housed therein are sent out by a transportation section 50 sequentially sheet by sheet from the top one in the cassette. The sheet sent out is transported via a transport path 33 to the electrophotographic processing section 47 of the laser recording section 32.

The LSU 46 has a semiconductor laser for emitting laser light in accordance with image data from the foregoing memory, a polygon mirror for constant angular velocity deflection with respect to the laser light, and an f-θ lens for adjusting the light which has been thus deflected at a constant velocity so that the light is deflect at a constant angular velocity on a photosensitive drum 48 of the electrophotographic processing section 47.

The electrophotographic processing section 47 is equipped with a charger, a developer, a transfer unit, a separating unit, a cleaner, and a discharger around the photosensitive drum 48, in a known manner, as well as a fixing unit 49 on a downstream side in the sheet transport direction.

Further, on a downstream side to the fixing unit 49 in the sheet transport direction, a sheet discharge transport path is provided, from which a transport path 57 leading to the post-processing device 34 and a transport path 56 leading to the duplex unit 55 branch off.

In accordance with the image data read from the image memory, an electrostatic latent image is formed on the photosensitive drum 48 by causing the laser light to scan a surface of the photosensitive drum 48 under control of the LSU 46, and is visualized with use of toner. The toner image thus obtained is then electrostatically transferred and fixed onto a surface of a sheet transported by the sheet housing and transporting section.

The sheet on which an image is thus formed is selectively transported from the fixing unit 49, either to the post-processing device 34 via the transport path 57, or otherwise to the duplex unit 55 via the transport path 56.

The post-processing device 34 has a first discharge tray 341 and a second discharge tray 342, which are vertically arranged in a left-side part of the device and receive, from the transport path 57, the sheet on which an image is recorded by the digital copying machine 1. In the post-processing device 34, a sheet receiving opening 343, a first transport path 344, a second transport path 345, a first switching gate 346, a second switching gate 347, a switch-back transport path 348, first discharge rollers 349, second discharge rollers 350, and the like are provided, so as to operate according to various discharge modes.

In a first discharge mode, a sheet received at the sheet receiving opening 343 is sent along the first transport path 344 directly onto the first discharge tray 341 through the first discharge rollers 349.

In a second discharge mode, a sheet received at the sheet receiving opening 343 is guided by the first switching gate 346 to the second transport path 345, then guided by the second switching gate 347 to the second discharge rollers 350 side, and discharged through the second discharge rollers 350 onto the second discharge tray 342.

In a third discharge mode, a sheet received at the sheet receiving opening 343 is guided by the first switching gate 346 to the second transport path 345, then guided by the second switching gate 347 to the switchback transport path 348. When a rear end of the sheet passes the second switching gate 347, the sheet is switched back, then guided by the second switching gate 347 to the second discharge rollers 350, and discharged by the second discharge rollers 350 onto the second discharge tray 342.

Conventionally known offset systems 351 and 352 are provided at the first discharge tray 341 and the second discharge tray 342, respectively. The offset systems 351 and 352 are designed each to displace a set of discharged sheets from another set in a direction substantially orthogonal to the discharge direction, so that sheets with images recorded thereon are housed in a state of being grouped per job or per mode. The post-processing device 34 further includes a stapling section (not shown), etc.

Figure 4:
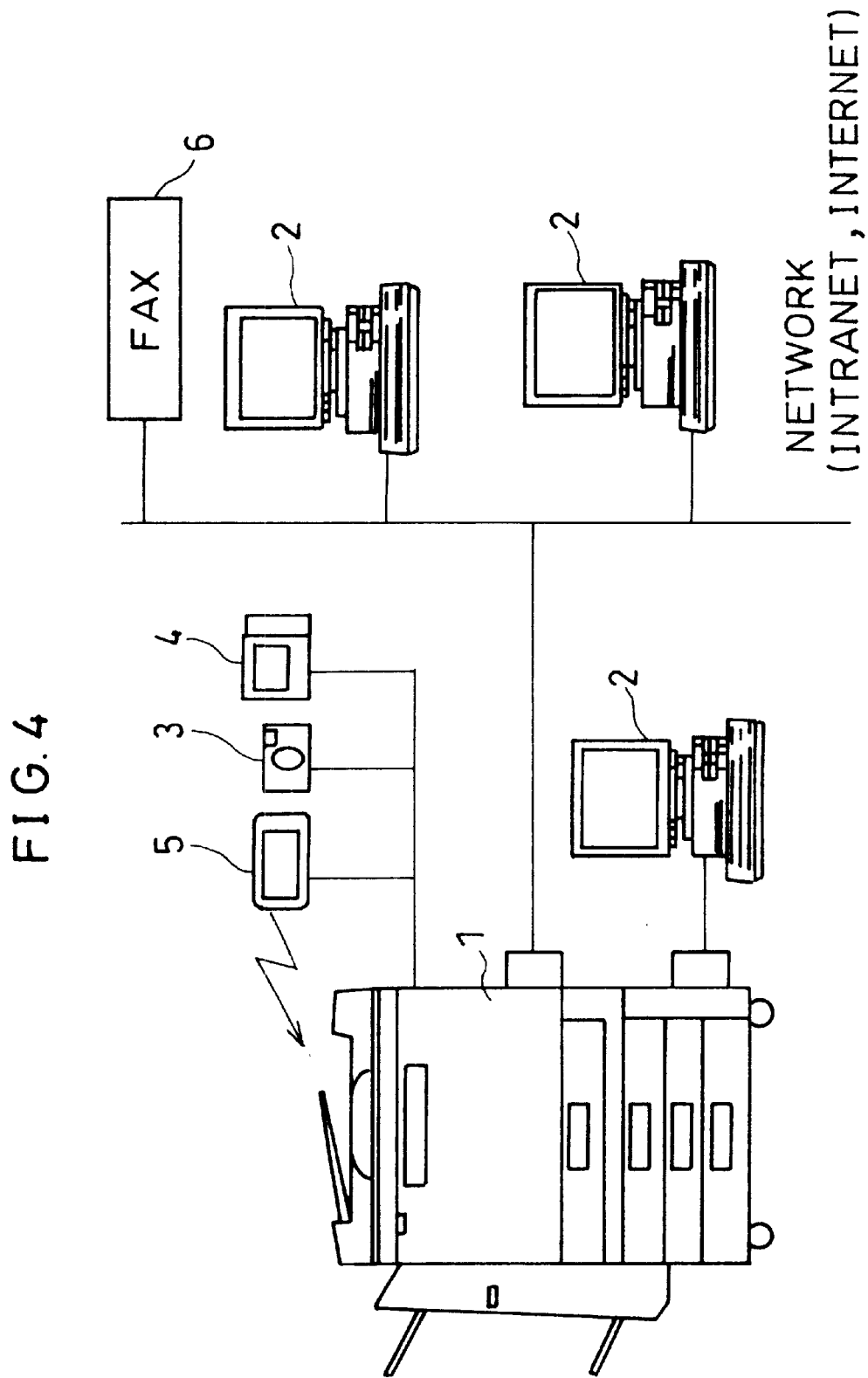
FIG. 4 is an explanatory view illustrating a network environment involving the foregoing digital copying machine.

As shown in FIG. 4, the digital copying machine 1 is connected through network with external image processing devices, for example, a personal computer 2, a digital camera 3, a digital video camera 4, a portable terminal unit 5, and a facsimile machine 6.

Image data transferred through an interface from the image processing device thus connected through network are once sent to an image processing section of the digital copying machine 1, and after a predetermined processing is applied thereto, an image based on the data is recorded, reproduced, and outputted from the laser recording section 32.

Next, a structure and functions of the image processing device for applying image processing to information of the read original document image, in the digital copying machine 1.

Figure 5:
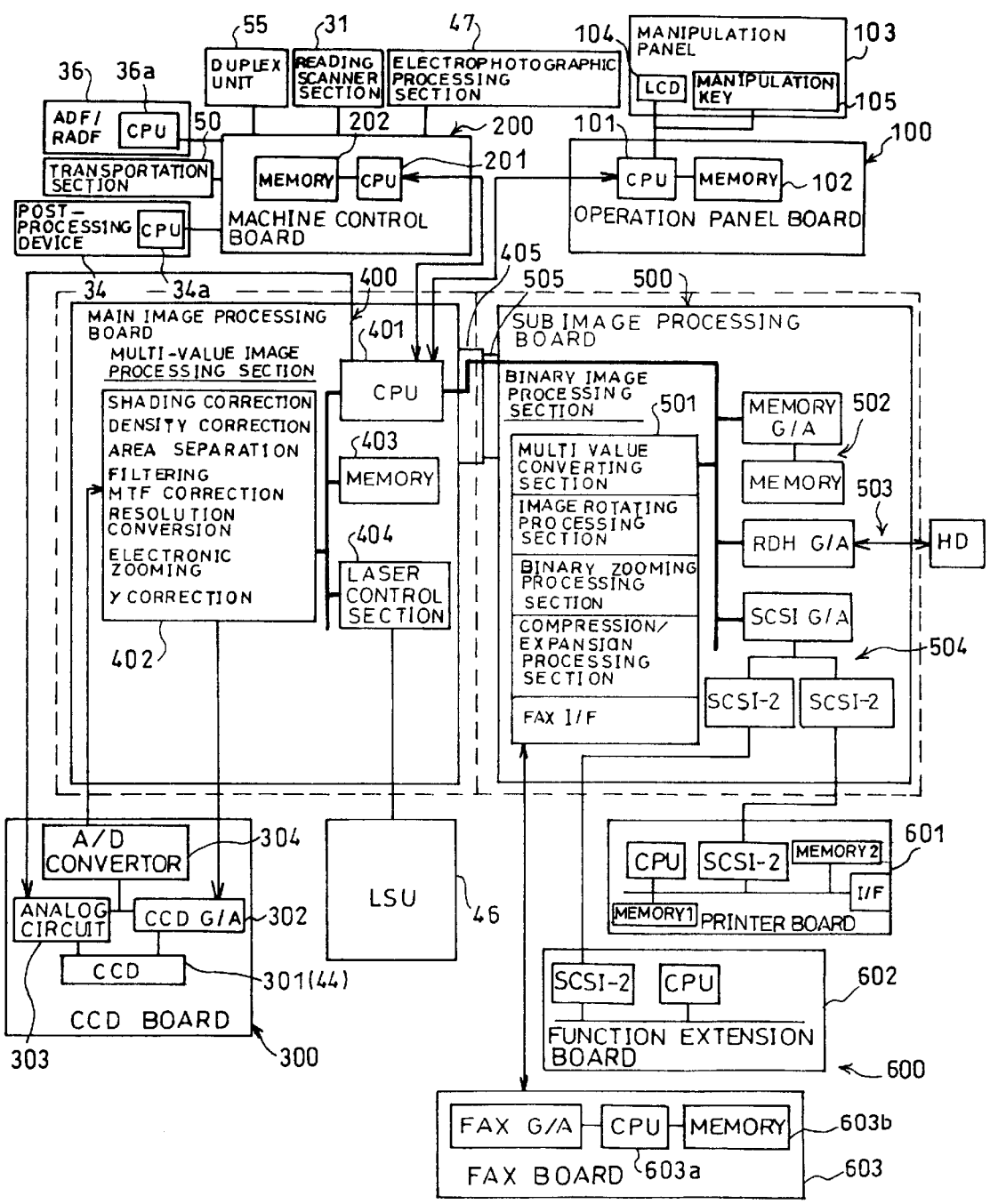
FIG. 5 is a block diagram illustrating a circuitry in an image processing section provided in the digital copying machine.

FIG. 5 is an overall block diagram illustrating component units, the image processing section, etc. constituting the digital copying machine 1. The figure shows a state in which a main central processing unit (CPU) 401 shown substantially at center of the figure controls operations in association with sub CPUs which are respectively installed in the units.

As clear from the foregoing block diagram, the digital copying machine 1 is roughly composed of an operation panel board 100, a machine control board 200, a CCD board 300, a main image processing board 400, a sub image processing board 500, an extension board group 600, etc. The operation panel board 100, above right in the figure, manages and controls a manipulation panel. The machine control board 200, above left in the figure, manages and controls each unit constituting the digital copying machine 1. The CCD board 300, below left in the figure, electrically reads an original document image and converts it into electronic data. The main image processing board 400, center in the figure, applies predetermined processing to the original document image which has been converted into the electronic data by the CCD board 300. The sub image processing board 500 further applies predetermined image processing to the image information processed by the main image processing board 400. The extension board group 600 (printer board, facsimile (FAX) board, function extension board), right below, is connected through interface with the sub image processing board 500.

The following description will depict respective contents managed and controlled by the foregoing boards.

The operation panel board 100, basically controlled by a sub central processing unit (CPU) 101, manages operation input through a display screen of an LCD display section 104 provided on a manipulation panel 103, and a manipulation key group 105 for inputting instructions regarding the modes.

The operation panel board 100 is also provided with a memory 102 for storing control information of various kinds in the manipulation panel 103, including data inputted through the manipulation key group 105 and information to be displayed on the LCD display section 104.

In this arrangement, the sub CPU 101 communicates control data with the main CPU 401, so as to instruct operations of the digital copying machine 1. From the main CPU 401, control signals indicating operation states of the digital copying machine 1 are transmitted to the sub CPU 101, so that the current state of the device is displayed to the operator through the LCD display section 104 of the manipulation panel 103.

The entire machine control board 200 is controlled by the sub CPU 201, so as to manage a document feeder 36 as above described, such as an automatic document feeder (ADF) or a recirculating automatic document feeder (RADF), the scanner section 31 for reading an original document image, the electrophotographic processing section 47 for reproducing image information into images, the sheet transportation section 50 for feeding out sheets of recording paper on which images are to be recorded from cassettes and sequentially transporting the same one by one to the electrophotographic processing section 47, the duplex unit 55 for recirculating a sheet so that images are formed on both sides, the post-processing device 34 for applying post-processing such as stapling to sheets with images recorded thereon, etc.

The CCD board 300 is composed of a CCD 301 for electrically reading original document images, a circuit (CCD gate array) 302 for driving the CCD 301, an analog circuit 303 for adjusting a gain for analog data outputted from the CCD 301, an A/D converter 304 for converting the analog output of the CCD 301 into digital signals and outputting the same as electronic data, and the like. The CCD board 300 is controlled by the main CPU 401.

The main image processing board 400, controlled by the main CPU 401, is composed of a multivalue image processing section 402, a memory 403, a laser controller 404, and the like. Based on electronic data of the original document images transmitted from the CCD board 300, in order that the gray levels of the images can be reproduced in desired conditions, the multivalue image processing section 402 applies processing operations such as shading correction, density correction, area separation, filtering, MTF (modulation transfer function) correction, resolution change, electronic zooming (variable magnification), and γ correction, with respect to image data which remain multi-valued. The memory 403 stores processed image data, various control information such as information regarding processing procedure control, and other information. The laser controller 404 controls and transfers image data to the LSU 46 so that images are reproduced with use of the processed image information.

The sub image processing board 500 is connected with the main image processing board 400 with connectors provided therebetween. The sub image processing board 500 is composed of a binary image processing section 501, a memory section 502, a hard disk device 503, an interface section 504, and the like. The memory section 502 is composed of a memory for storing and managing processed binary image information and control information for image processing, as well as a gate array for controlling the memory. The hard disk device 503 is composed of (i) a disk memory for storing original document image information equivalent to images on a plurality of sheets, and allowing original document image information for a plurality of sheets to be read out repeatedly a desired number of times so as to produce the desired number of copies, and (ii) gate arrays for controlling the disk memory. The interface section 504 is composed of an SCSI as an external interface and a gate array for controlling the SCSI. These component parts of the sub image processing board 500 are controlled by the main CPU 401 on the main image processing board 400.

Further, the binary image processing section 501 is composed of a processing part for converting multivalue image information into a binary image, a processing part for rotating an image, a binary variable magnification (zooming) processing part, and the like. The binary image processing section 501 is further equipped with a facsimile interface so as to transmit/receive facsimile images through communication means.

The extension board group 600 includes a printer board 601, a function extension board 602, a facsimile (FAX) board 603, and the like. The printer board 601 makes it possible that image data supplied from the personal computer 2 and the like are outputted in the printer mode from the laser recording section 32 of the digital copying machine 1. The function extension board 602 extends editing functions of the digital copying machine 1 so that the characteristics of the digital copying machine 1 are fully utilized. The FAX board 603 makes it possible that original document images taken in through the scanner section 31 of the digital copying machine 1 are sent to the other party of communication, and that image information transmitted from the other party is outputted by the laser recording section 32 of the digital copying machine 1.

The following description will explain, in more detail, respective image data processing operations and image data flows in the copy mode, the facsimile mode, and the printer mode of the digital copying machine 1.

(Copy Mode)

An original document set at a predetermined position on the RADF 36 of the digital copying machine 1 is supplied onto the original document platen 35 of the scanner section 31 sheet by sheet sequentially, and images of the original document are sequentially read by the scanner unit 40 arranged as described above, and are transferred to the main image processing board 400 in 8-bit electronic image data form.

The 8-bit electronic data thus transferred to the main image processing board 400 are, as 8-bit electronic image data, subjected to a predetermined processing operation on the multivalue image processing section 402. Then, a processing operation such as γ correction is applied to the 8-bit electronic image data, and the processed data are sent to the LSU 46 via the laser controller 404.

Through this process, the original document image read by the scanner section 31 of the digital copying machine 1 are outputted as a copied image in gray scale from the laser recording section 32.

(Electronic RDH (Recycle Document Handler) Function in Copy Mode)

Likewise, the original document set at a predetermined position on the RADF 36 of the digital copying machine 1 is supplied onto the original document platen 35 of the scanner section 31 sheet by sheet sequentially, and images on the original document are sequentially read by the scanner unit 40 arranged as described above, and are transferred to the main image processing board 400 in, for example, 8-bit electronic data form. The 8-bit electronic data thus transferred to the main image processing board 400 are, as 8-bit electronic image data, subjected to a predetermined processing operation on the multivalue image processing section 402.

The 8-bit electronic image data are subsequently sent to the sub image processing board 500 through the connector 405 on the main image processing board 400 and the connector 505 on the sub image processing board 500. The 8-bit electronic image data thus sent to the sub image processing board 500 are subjected to error diffusion or the like and conversion from the 8-bit electronic image data to 2-bit electronic image data at the multivalue converting section of the binary image processing section 501.

Incidentally, the conversion of 8-bit electronic image data into 2-bit electronic image data in addition to other processing such as the error diffusion aims to avoid deterioration of image quality. This is because satisfactory image quality is not obtained by simple multivalue-to-binary conversion in some cases. The conversion of 8-bit electronic image data into 2-bit electronic image data is also a result of consideration to image memory capacity.

The 2-bit electronic image data thus obtained through conversion are transferred to the disk memory of the hard disk device 503, data equivalent to one page at once, and are temporarily stored therein. When all the data of the original document set on the RADF 36 of the digital copying machine 1 are read, the 2-bit electronic image data temporarily stored in the disk memory are read out repeatedly a set number of times which corresponds to the number of required copies to be produced, under control of the gate array. The read-out 2-bit electronic image data are again sent through the connectors 405 and 505 to the main image processing board 400, where the image data are subjected to γ correction and the like. The processed data are sent to the LSU 46 via the laser controller 404.

Incidentally, in the above description, it is explained that after all the images of all the original document are read, the images are read out repeatedly a number of times which corresponds to the number of required copies to be produced. Instead, it is possible to make the image output for the first copy be started whenever a set quantity of images becomes ready.

Through this process, the original document image read by the scanner section 31 of the digital copying machine 1 are outputted as a copied image in gray scale from the laser recording section 32.

(Printer Mode)

Images transmitted from a networked external information processing device such as the personal computer 2 or the digital camera 3 shown in FIG. 4 are developed on the printer board 601 into images divided into page units, and are temporarily transferred from the SCSI constituting the interface section 504 to the sub image processing board 500, then to memory such as the hard disk device 503.

To briefly explain flow of this process by taking the personal computer 2 as an example, text data or the like produced by the personal computer 2 are transferred in a data format such as PS (postscript) or PCL (printer control language), and the transferred data are temporarily stored in a buffer (memory 2) on the printer board 601, and are developed on a page memory (memory 1) by an RIP (raster image processor) driven by the CPU.

The image data developed on the page memory (memory 1) are transferred through the SCSI to the sub image processing board 500 and are stored in the hard disk device 503. Here, if the image data developed and stored in the page memory (memory 1) cannot be stored in the hard disk device 503 due to insufficient capacity, they remain in a waiting state until the hard disk device 503 becomes open.

Incidentally, the images thus developed into the page images on the printer board 601 are transferred to the sub image processing board 500, but the page images are not subjected to the binary image processing, and are simply stored in the hard disk device 503 temporarily. Besides, when the page images thus stored in the hard disk device 503 are read out therefrom, the binary image processing is not carried out with respect to the page images.

Subsequently, the image information thus temporarily stored in the hard disk device 503 is read out from the hard disk device 503 in such a manner that the image information is read out in a predetermined page order, and is transferred to the main image processing board 400. In the main image processing board 400, $\gamma$ correction is applied to the image information, and the laser controller 404 controls the write-in of images by the LSU 46 so that the images are properly reproduced.

(Facsimile Mode)

Operations in the facsimile mode are classified into transmission of an original document to the other party and reception of an original document from the other party.

The transmission of an original document to the other party is first explained as follows. The original document to be transmitted, which is placed at a predetermined position on the RADF 36 of the digital copying machine 1, is sent onto the original document platen 35 of the scanner section 31 sheet by sheet sequentially, and images of the original document are sequentially read by the scanner unit 40 as described above, and thereafter transferred in the 8-bit electronic data form to the main image processing board 400.

Then, the 8-bit electronic data thus transferred to the main image processing board 400 are subjected as 8-bit electronic image data to predetermined image processing on the multivalue image processing section 402. The 8-bit electronic image data are sent to the sub image processing board 500 through the connector 405 on the main image processing board 400 and the connector 505 on the sub image processing board 500. The 8-bit electronic image data are converted to 2-bit electronic image data at the multivalue-to-binary converting part of the binary image processing section 501, as well as subjected to error diffusion and other processing.

Incidentally, the conversion of 8-bit electronic image data into 2-bit electronic image data in addition to other processing such as the error diffusion aims to lessen deterioration of image quality. This is because satisfactory image quality is not obtained by simple multivalue-to-binary conversion in some cases.

The original document to be transmitted, thus converted into binary images, is compressed in a predetermined form, and stored in the memory section 502. Then, when necessary transmission procedure is taken and a state transmissible to the other party is ensured, the original document images in the predetermined compression form read out from the memory section 502 are transferred to the FAX board 603 side. The original document images to be transmitted, thus transferred to the FAX board 603, are therein subjected to necessary processing such as change in the compression form, and thereafter are sequentially transmitted to the other party through communication lines.

The following description will explain processing of original document images transmitted from the other party. When an original document is transmitted from the other party through communication lines, the FAX board 603 receives the original document images transmitted from the other party while taking a necessary communication procedure, and the received images compressed in a predetermined form are sent from the facsimile interface provided in the binary image processing section 501 of the sub image processing board 500 to the compression/expansion processing part or the like of the binary image processing section 501, where the original document images transmitted in the page image form are reproduced.

Subsequently, the original document images thus reproduced as page-unit images are transferred to the main image processing board 400. In the main image processing board 400, $\gamma$ correction is applied to the original document images, and the laser controller 404 controls the write-in of images by the LSU 46 so that the images are properly reproduced.

As clear from the above description, the image processing section for applying predetermined processing operations to image information is divided into the following two main parts: the main image processing board 400, which processes original document images read in by the scanner section 31 as multivalue image information; and, the sub image processing board 500, which applies predetermined processing operations such as binary processing to the original document image information processed as multivalue image information by the main image processing board 400, or applies predetermined processing operations to image information supplied from external apparatuses which are connected thereto through the external interface, and thereafter transfers the processed image information to the multivalue image processing section 402 (main image processing board 400).

Further, the main image processing board 400 includes the laser controller 404 for controlling the image information writing operation of the LSU 46, so that images are reproduced by the LSU 46 onto the photosensitive drum 48 of the electrophotographic processing section 47. With this arrangement, the original document images read in by the scanner section 31 can be reproduced as copy images from the laser recording section 32, without losing characteristics which the original document images as multivalue images possess. In the case where a massive original document is processed and outputted at a high speed by using an electronic RDH function or the like, the sub image processing board 500, the hard disk device 503, etc. may be additionally used so that reproduction of copy images is ensured.

Furthermore, it is also possible to apply appropriate processing operations to image information according to characteristic functions which the digital copying machine 1 possesses as a digital device. Here, the operations include processing and outputting operations with respect to image information supplied from external apparatuses including a facsimile machine and a personal computer, as well as, exclusively with respect to image information supplied from a facsimile machine, a binary processing operation for processing original document images which have been multivalued-image-processed (whose characteristics are retained).

Furthermore, by dividing the image processing section, it is possible to prepare many variations (lineups) of the digital copying machine 1, to set up a digital copying machine so as to comply with the user's demand, and to extend the system to comply with the user's demand after the setting.

The CPU 401 provided on the main image processing board 400 controls the sub image processing board 500 as well in the foregoing arrangement. This ensures that the entire flow of the image processing operation which is continuously carried out from one processing section to the other is controlled in the respective processing sections, and the flow of data and processing operations is made smoother, with no possibility of losing image data.

The foregoing is an explanation of the image processing section for processing image data inputted through the scanner section 31, or the extension board group 600, installed in the digital copying machine 1.

The following description will explain characteristics of the digital copying machine 1 in output of images, while referring to FIGS. 1, 2, and 6 through 11.

Here, a case in the printer mode wherein data transferred from the networked computer 2 are printed out is taken as an example, but the same scheme is applicable as well in the case where the electronic RDH function in the copy mode described above is used.

Figure 1:
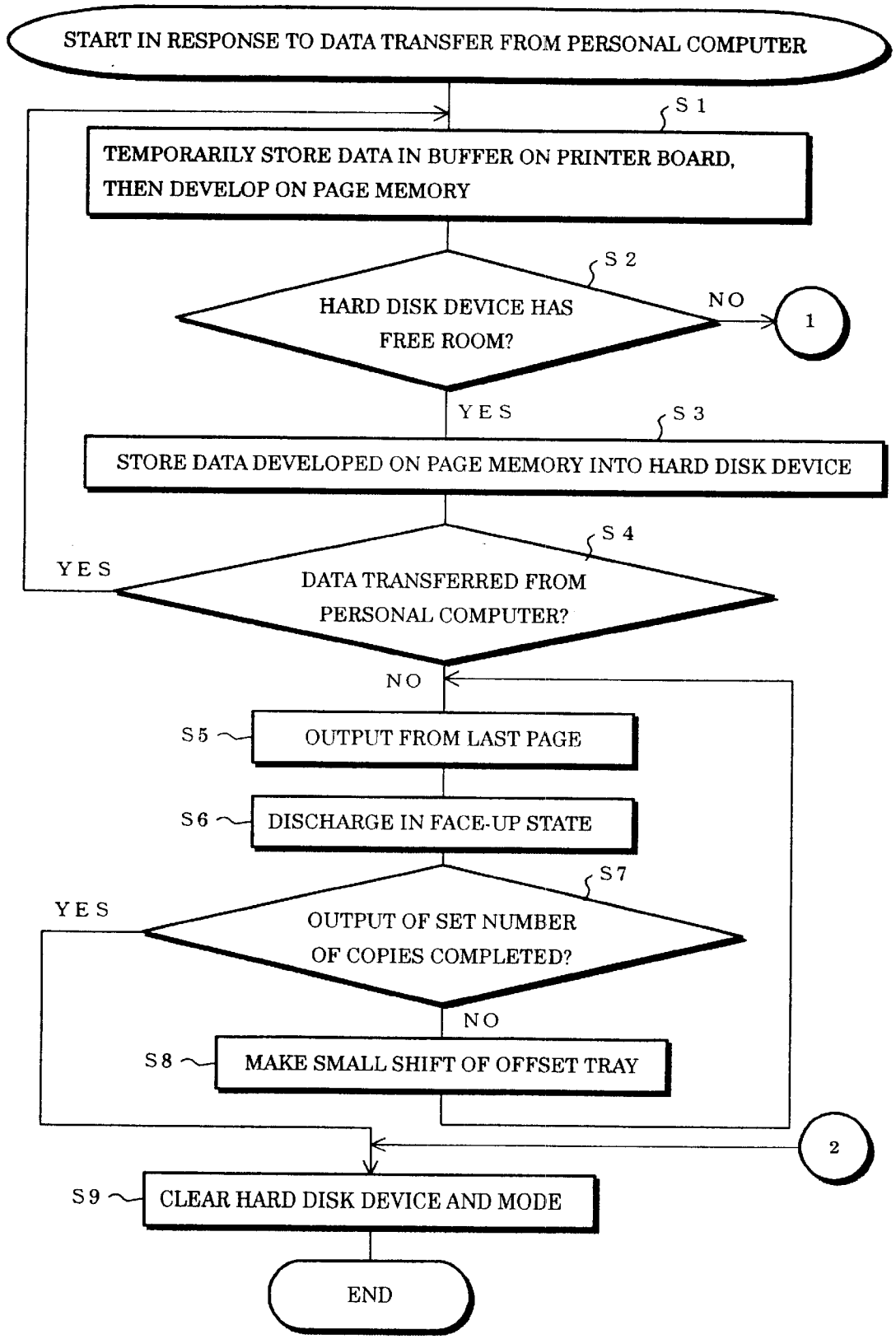
FIG. 1 is a flowchart of a process of output of image data in a digital copying machine as an example of an image output processing apparatus in accordance with an embodiment of the present invention.
Figure 2:
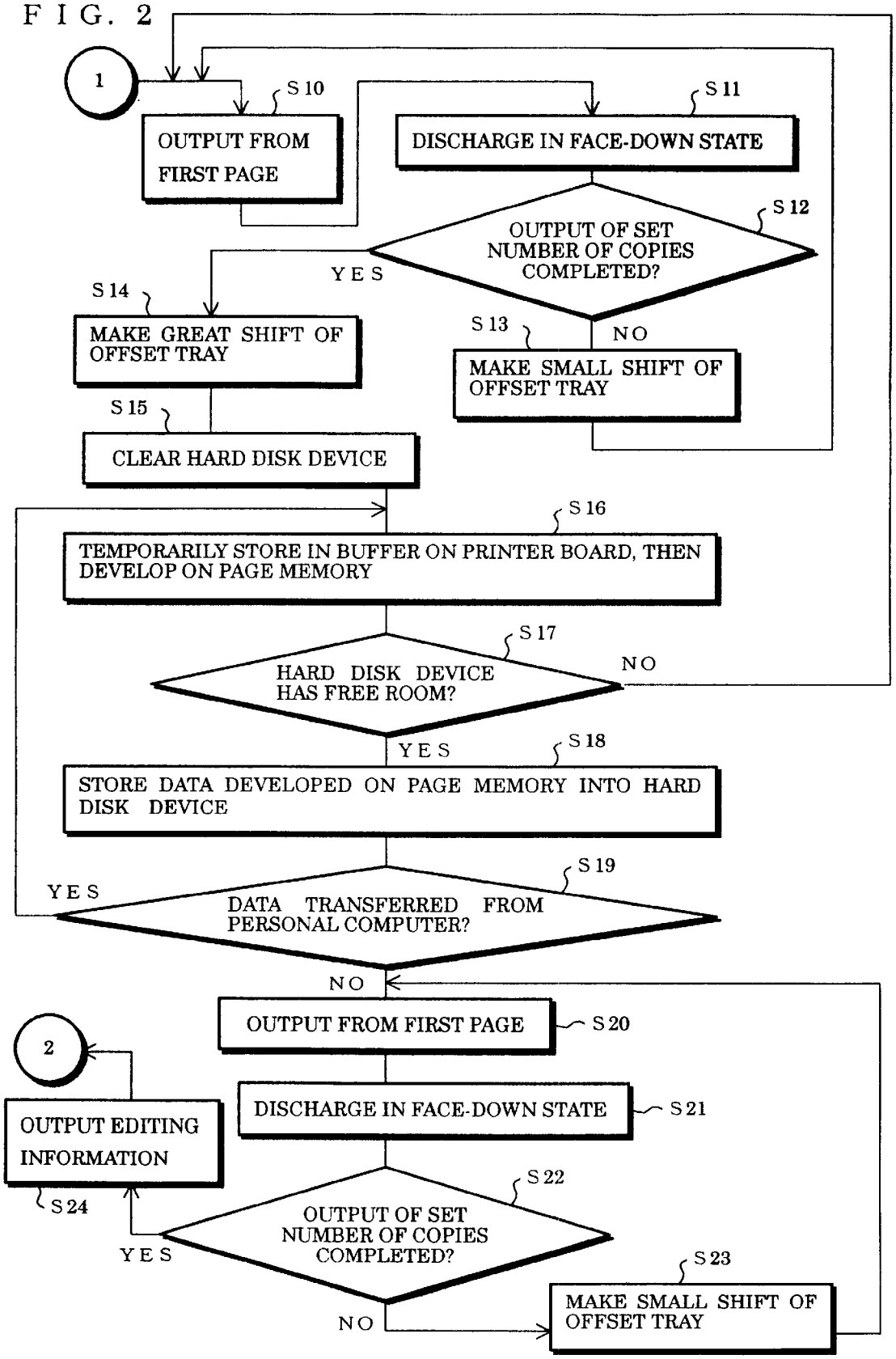
FIG. 2 is a flowchart continued from the flowchart of FIG. 1.

Flowcharts of FIGS. 1 and 2 show processing procedures in the digital copying machine 1 for outputting image data transferred from the personal computer 2 so as to form images on the sheets. They focus on the control operation of the CPU 401, covering its control on the operation of the post-processing device 34.

When text data or the like produced by the personal computer 2 are transferred in the PS or PCL data format to the digital copying machine 1, the transferred data are temporarily stored in the buffer (memory 2) on the printer board 601 and are developed on the page memory (memory 1) by the RIP (raster image processor) driven by the CPU (on the printer board 601) (S1).

Next, whether or not the disk memory of the hard disk device 503 has room is judged (S2), and if it has room, the image data developed on the page memory (memory 1) are transferred to the sub image processing board 500 through the SCSI, so as to be stored in the hard disk device 503 (S3). Thereafter, until it is judged at S3 that the hard disk device 503 has become full with no room or it is judged at S4 that data is no more transferred from the personal computer 2, the processing operation of S1 through S3 is repeated.

In the case where it is judged at S4 that data is no more transferred from the personal computer 2 before it is judged at S2 that the hard disk device 503 has become full (in other words, an amount of image data transferred from the personal computer 2 is smaller than free disk memory capacity of the hard disk device 503, and the hard disk device 503 has sufficient capacity for the image data), the flow proceeds to S5. This mode in which the flow proceeds to S5 is hereinafter referred to as single-block batch processing mode.

At S5, the image data stored in the hard disk device 503 are outputted from the last page in an output mode instructed through the manipulation panel 103 or the personal computer 2, and sheets with the images are discharged, without the switchback transport path 348 in the post-processing device 34, onto the first discharge tray 341 in a face-up state in which the recording surfaces thereof face upward (S6).

Normally, the data transferred from an external apparatus such as the personal computer 2 are transferred sequentially from the top of the data, but a digital copying machine is generally designed so as to discharge a sheet in the face-up state with the recording surface thereof facing upward, on which a next sheet discharged is placed. Therefore, by discharging from the last page as at S5, rearrangement of the sheets in the page order after discharge is completed is unnecessary, even in the case of the face-up discharge.

Then, after the discharge at S6 is completed, whether or not output of a set number of copies is completed is judged.

If it is judged to have been completed, the disk memory of the hard disk device 503 is cleared and the preliminarily set output mode for outputting the set number of copies is cleared (S9) Thus, the processing operation ends.

If it is judged at S7 that the output of the set number of copies is not completed yet, a discharge position is changed (offsetted) by using the offset system 351 of the first discharge tray 341 discharging sheets in the post-processing device 34, the flow returns to S5, and the operation of S5 through S8 is repeated until it is judged at S7 that the output of the set number of copies is completed. When the completion is judged at S7, the flow proceeds to S9, with which the processing operation ends.

On the other hand, in the case where it is judged at S2 that the hard disk device 503 has become full (in other words, the quantity of the image data transferred from the personal computer 2 exceeds free disk memory capacity of the hard disk device 503 thereby causing disk memory shortage) before it is judged at S4 that data is no more transferred from the personal computer 2, the flow proceeds to S10 so that the image data stored in the hard disk device 503 are outputted into images in a set mode. This mode in which the flow proceeds to S10 is hereinafter referred to as plural-block split processing mode.

At S10, the image data stored in the hard disk device 503 are outputted from the top page, and the sheets with the images are turned over with use of the switchback transport path 348 in the post-processing device 34. The sheets are discharged onto the second discharge tray 342 in a face-down state in which the recording surfaces thereof face downward (S11).

When the discharge at S11 is completed, whether or not output of a set number of copies is completed is judged at S12. If it is judged to have been completed, the flow simply proceeds to S14, but if not, a discharge position is offsetted by using the offset system 352 of the second discharge tray 342 discharging sheets in the post-processing device 34, the flow returns to S10, and the operation of S10 through S13 is repeated until it is judged at S12 that the output of the set number of copies is completed. When the completion is judged at S12, the flow proceeds to S14.

At S14, the offset of the second discharge tray 342 is increased as compared with that at S13. The offset of the second discharge tray 342 at S13 aims to clarify distinction between sets of sheets which are copies of the same pages, for example, between the first set and the second set, whereas the change of the discharge position at S14 aims to clarify distinction, not between sets of sheets, but between blocks of sets of sheets (outputs) which respectively correspond to blocks of image data, therefore pages of one block differing from pages of another block.

After completion of the processing operation at S14, the disk memory of the hard disk device 503 is cleared (Sis). This leads to resumption of the processing operation of developing the data transferred from the personal computer 2 in the page memory (memory 1) by the RIP (S16), as well as the operation of storing, into the hard disk device 503, developed data in a waiting state in the page memory of the printer board 601 (S18). The operation of S16 through S19 which is identical to that of S1 through S4 is repeated until it is judged at S17 that the disk memory of the hard disk device 503 has become full.

When the hard disk device 503 becomes full, again the flow returns to S10, and the operation of S10 through S13 is repeated so that the image data stored in the hard disk device 503 are outputted till the set number of copies are obtained, while the second discharge tray 342 is offsetted whenever one set of sheets is discharged.

Thereafter, in a state in which the hard disk device 503 has free memory region, when it is judged at S19 that there will be no more data transfer from the personal computer 2, the operation of S20 through S23 which is identical to that of S10 through S13 is repeated so that output for the set number of copies is completed. Then, editing information which will be described in detail afterwards is displayed either on the LCD display section 104 of the manipulation panel 103, on a display of the personal computer 2, or otherwise on a sheet of paper (S24).

Thereafter, the memory region of the hard disk device 503 is cleared, while the preliminarily set output mode for outputting the set number of copies is cleared (S9). Thus, the processing operation ends.

Figure 6:
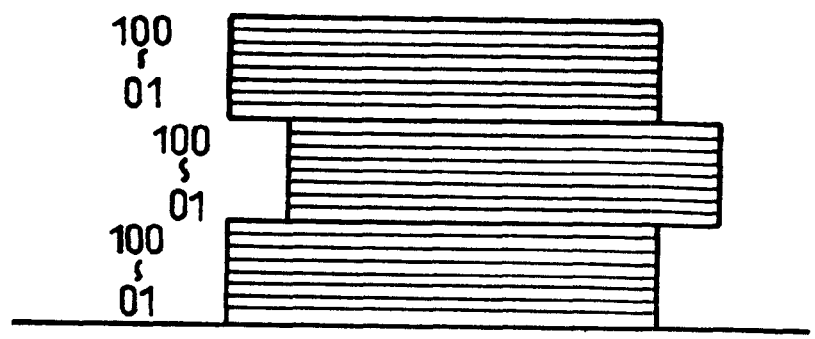
FIG. 6 is an explanatory view illustrating a state of discharged sheets of paper in the case where image data, divided into a plurality of blocks, are being processed.
Figure 7:
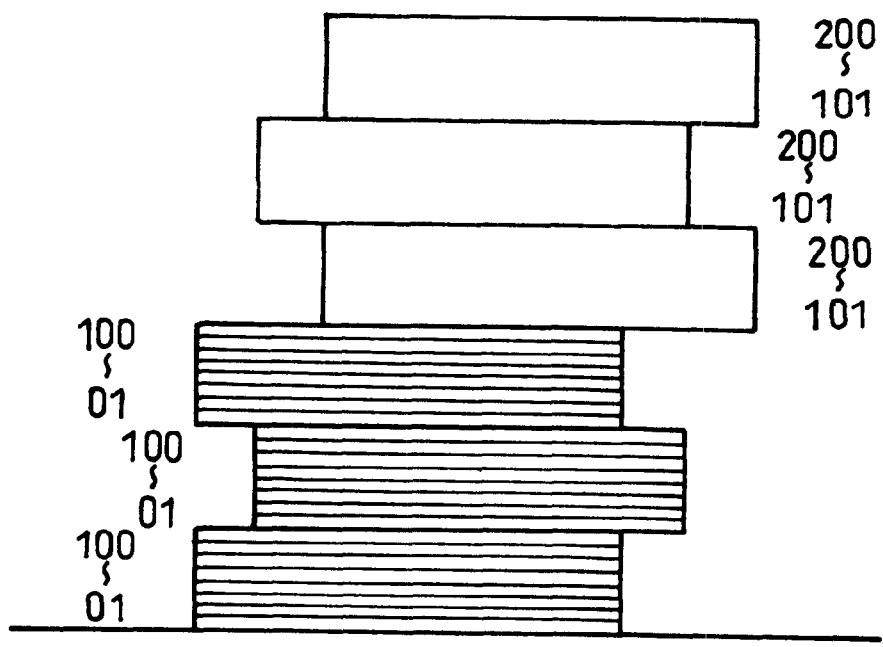
FIG. 7 is an explanatory view illustrating a state of discharged sheets of paper in the case where image data, divided into a plurality of blocks, are processed.

FIGS. 6 and 7 illustrate states of piles of discharged sheets in the case where the disk memory of the hard disk device 503 of the digital copying machine 1 has a capacity of 100 pages, the image data transferred from the personal computer 2 are data of page 1 through page 200, and the number of copies to be produced is set to 3 through the manipulation panel 103.

Sheets with outputted images are discharged onto the second discharge tray 342. The output is conducted in the plural-block split processing mode since the hard disk device 503 becomes full at a stage when the image data of pp. 1–100 are developed. The image data of pp. 1–100 stored in the hard disk device 503 are outputted in the order from p. 1 to p. 100, and the sheets of paper with images recorded thereon are discharged in the face-down state till three sets of pp. 1–100 are obtained, being offsetted leftward/rightward every time discharge of one set of pp. 1–100 is completed.

As a result, as shown in FIG. 6, three sets of sheets with the images of pp. 1–100 are piled with clear distinction therebetween.

On the three sets of sheets of pp. 1–100 thus outputted, image data of pp. 101–200 are likewise outputted and discharged till three sets of pp. 101–200 are obtained, each being offsetted leftward/rightward from another. Here, as shown in FIG. 7, the offset of the second discharge tray 342 for distinction of the last set of sheets with images of pp. 1–100 from the first set of sheets with images of pp. 101–200 is greater as compared with the offset for distinction between the sets of sheets with the same images in each set.

Figure 8:
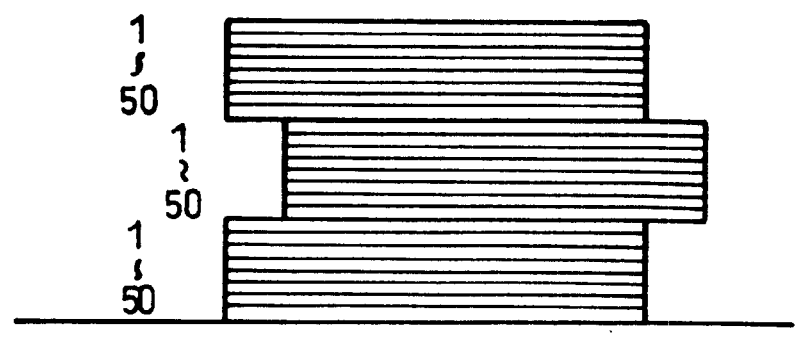
FIG. 8 is an explanatory view illustrating a state of discharged sheets of paper in the case where image data as one block are processed.

On the other hand, FIG. 8 illustrates a state of piles of discharged sheets of paper in the case where the disk memory of the hard disk device 503 of the digital copying machine 1 has a capacity of 100 pages, the image data transferred from the personal computer 2 are data of page 1 to page 50, and the number of copies to be produced is set to 3 through the manipulation panel 103.

Sheets with outputted images are discharged onto the first discharge tray 341. The output is conducted in the single-block batch processing mode. After the image data of pp. 1–50 are developed, the image data of pp. 1–50 stored in the hard disk device 503 are outputted in the reverse page order from p. 50 which is the last page, and the sheets of paper with images recorded thereon are discharged in the normal discharge manner in the face-up state without use of the switchback transport path 348, till three sets are obtained, being offsetted leftward/rightward every time discharge of one set of sheets of pp. 50–1 is completed.

As a result, as shown in FIG. 8, three sets of sheets, each set having the images of pp. 1–50, are piled with clear distinction therebetween.

Figure 9:
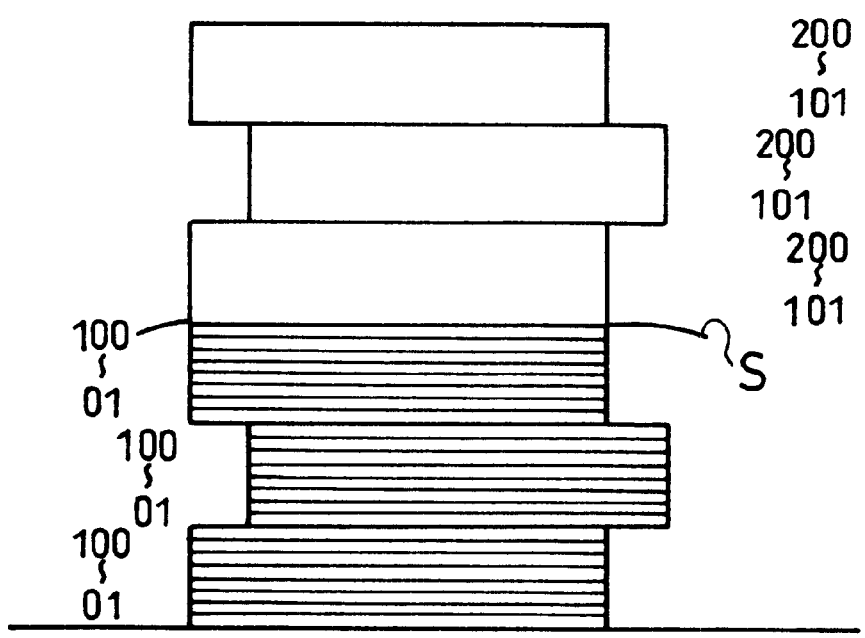
FIG. 9 is an explanatory view illustrating another state of discharged sheets of paper in the case where image data, divided into a plurality of blocks, are processed.

Incidentally, the foregoing explanation describes that the offset of the second discharge trays 342 for distinction of the last set of sheets with images of pp. 1–100 from the first set of sheets with images of pp. 101–200 is greater as compared with the offset for distinction between the sets of sheets with the same images in each set, but another scheme may be applied. For example, as shown in FIG. 9, a sheet having characteristics remarkably different from those of the foregoing piled sheets, in terms of color, quality, size, or the like, referred to as a distinction sheet S, may be discharged on the sets of sheets, whereby it may be possible to make the more significant distinction clearer. As to the size of the distinction sheet S, a size such that the distinction sheet S will not be hidden under subsequently piled sheets may be selected.

To make the distinction clearer with use of such a distinction sheet S, discharge of the distinction sheet S may be carried out instead of the greater move of the offset tray, at S14 in the flowcharts shown in FIGS. 1 and 2.

The plural blocks and sets of sheets discharged onto the first discharge tray 341 or the second discharge tray 342 (in this case, the second discharge tray 342) are, to be completed as copies of a document, re-arranged by a predetermined procedure, regarding which editing information is presented at S24 to the user.

Figure 10:
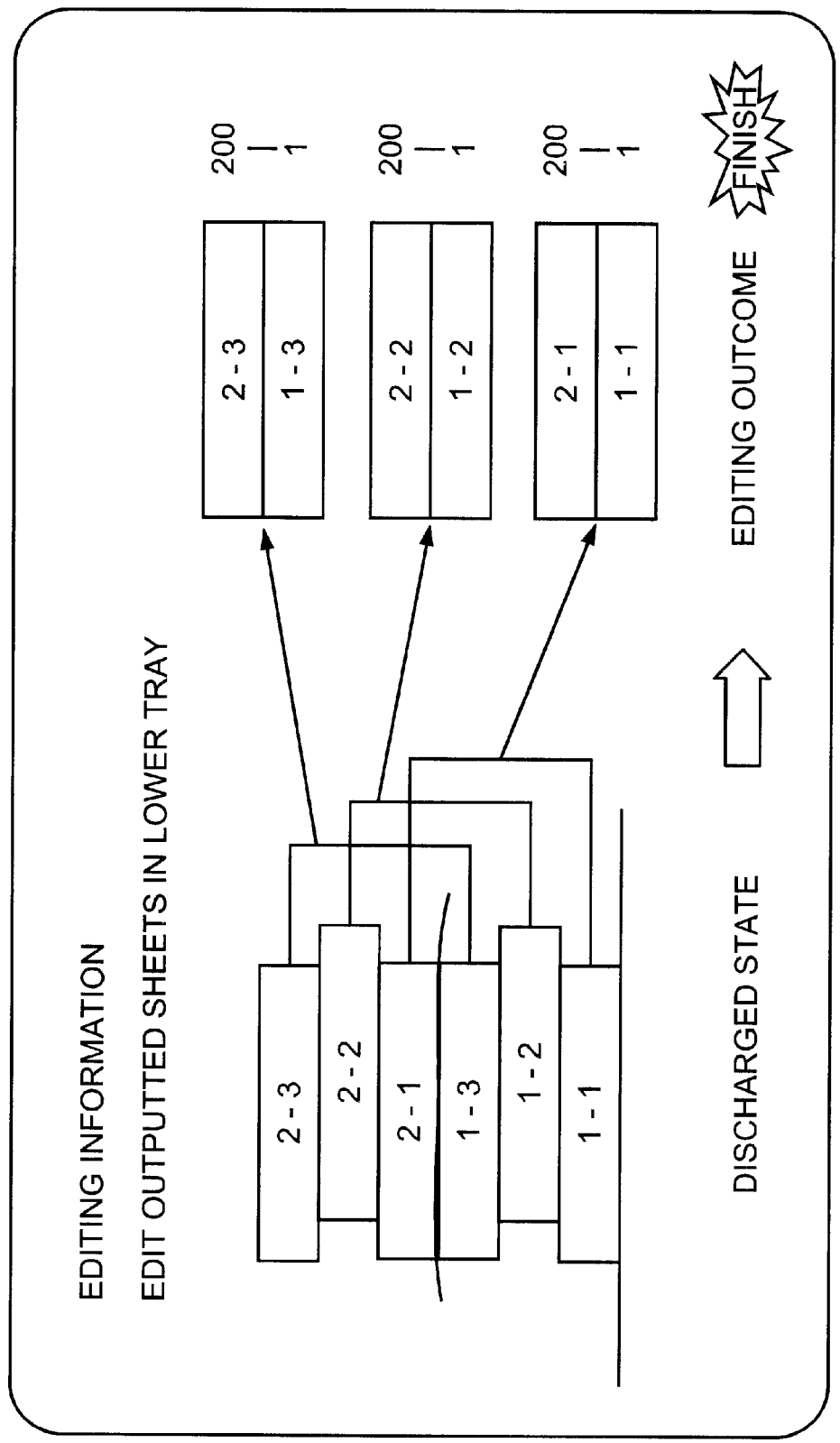
FIG. 10 is an explanatory view illustrating a state of outputted editing information.

The editing information may be presented with languages, symbols, images, etc., and one example is shown in FIG. 10. In FIG. 10, the editing operation (re-arrangement of outputted materials) is presented in an image information form, which includes a state of image-recorded materials which are outputted in the form of plural sets and blocks of sheets and discharged in the face-down state on the second discharge tray 342.

In the figure, 1-1 denotes the first set of sheets of the first block (pp. 1–100), 1-2, the second set of sheets of the first block (pp. 1–100) , 1-3, the third set of sheets of the first block (pp. 1–100), 2-1, the first set of sheets of the second block (pp. 101–200), 2-2, the second set of sheets of the second block (pp. 101–200), and 2-3, the third set of sheets of the second block (pp. 101–200).

The user, provided with such editing information as image information, can easily edit the sets of sheets into completed copies of a document by re-arranging the sets of sheets in accordance with the provided information.

Incidentally, the editing information is a mere example, and the manner of presentation may be partly changed.

Examples of the method for providing the editing information include a method of printing it out by using the laser recording section 32 of the digital copying machine 1, a method of displaying it on the LDS display section 104 on the manipulation panel 103, and a method of displaying it on a display of the networked personal computer 2 or the like.

By the method of printing out the editing information, it is possible to, at a stage of completion of output of images, make the digital copying machine 1 open for next processing, and moreover, it is possible to move the editing information to a desired place. Therefore, the editing operation of forming copies of a document from the plural sets of sheets can be carried out at a place, like on a desk, at a distance from the place where the editing information is displayed such as the digital copying machine 1 or the personal computer 2.

The method of displaying the editing information on the LSD display section 104 of the digital copying machine 1 has such an advantage of no consumption of sheets of paper and toner, and is suitable to a case where the sets of sheets can be easily re-arranged near the digital copying machine 1, for example, a case where the number of copies are to be produced, or a case where with a smaller quantity of data the number of blocks is small.

The method of displaying the editing information on a display of an external apparatus such as the networked personal computer 2 has an advantage of no consumption of sheets of paper and toner, as well as an advantage of making the digital copying machine 1 open for next processing at a stage of completion of output of images. Besides, the editing operation can be carried out on a desk on which the personal computer 2 is located, or the like.

The digital copying machine 1 is designed so that any desired method for providing editing information can be selected from the above and instructed by the user to the digital copying machine 1, and the digital copying machine 1 provides the editing information regarding the sets of sheets discharged on the discharge tray 341 or 342 by the instructed method.

Further, the digital copying machine 1 is designed so that the user can set necessity/non-necessity of output of such editing information.

Figure 11:
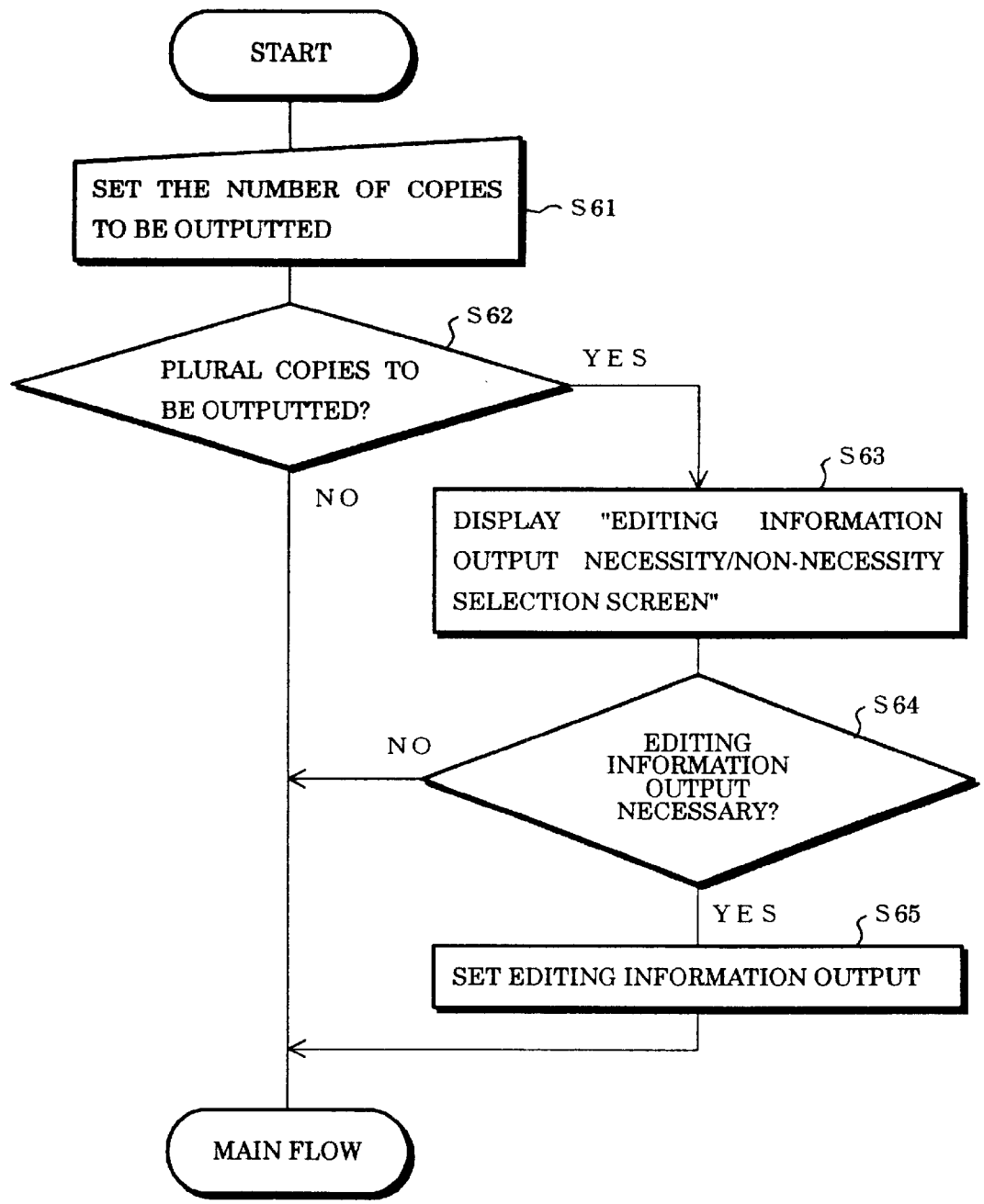
FIG. 11 is a flowchart of a process of instructing necessity/non-necessity of output of editing information.

More specifically, as shown in the flowchart of FIG. 11, when the user sets the number of copies to be produced (S61), the CPU 401 judges whether or not the set number is a plural number (S62). In the case where it is a plural number, a "screen for selection on necessity/non-necessity of output of editing information" is displayed on a display of an apparatus through which the user is inputting instructions, such as the LCD display section 104 on the manipulation panel 103 of the digital copying machine 1, or the display of the personal computer 2 (S63).

With this, the user instructs necessity/non-necessity of output of editing information (S64), and according to the instruction, in the case where the output of editing information is needed, the CPU 40 assumes a mode of outputting editing information at S65, and the flow enters the main flow. Then, at S24 as shown in the flowcharts of FIGS. 1 and 2, editing information is outputted.

On the other hand, in the case where the judgement at S62 is NO, or in the case where the user instructs non-necessity of output of editing information (NO at S64), the flow enters the main flow, bypassing S65 for the output of editing information.

For users who often use the digital copying machine 1 and well know the editing information provided in the case where image data are outputted by dividing into blocks, for example, display of the editing information every time is bothersome, and in the case where editing information is printed, it leads to waste of toner and sheets of paper. By allowing the user to instruct necessity/non-necessity of output of editing information, such unnecessary output of editing information is eliminated, thereby resulting in improvement of operability and elimination of waste.

Incidentally, herein the display through which the user inputs other instructions is designed to also display a screen used for inputting instruction on necessity/non-necessity of output of editing information, but keys or buttons for this instruction may be provided on the manipulation panel 103 of the digital copying machine 1.

Not only the necessity/non-necessity of output of editing information, but also a level of editing information to be outputted may be instructed in the following manner: various levels of editing information are prepared including, for example, a usual level with such contents as shown in FIG. 10 and levels with more detailed explanations, and editing information is outputted at a desired level instructed by the user by using the manipulation panel 103.

[Second Embodiment]

The following description will depict another embodiment in accordance with the present invention, while referring to FIGS. 11 through 19.

Incidentally, the members having the same structure (function) as those in the above-mentioned embodiment will be designated by the same reference numerals and their description will be omitted.

Again a digital copying machine (digital image forming apparatus) connected with an information processing device such as a personal computer, a digital video camera, a facsimile machine, etc. in a network environment is taken as an example.

The structure of the digital copying machine is substantially the same as that of the digital copying machine 1 of the foregoing first embodiment except that, as shown in flowcharts of FIGS. 12 and 13, the digital copying machine of the present embodiment is designed as follows: distinction sheets S are applied to all distinctions between groups of sheets, including distinctions between sets of sheets which are copies of the same pages, and distinctions between blocks of sets of sheets which respectively correspond to blocks of image data, therefore pages of one block differing from those of another block; and editing information is outputted on each distinction sheet S.

Figure 12:
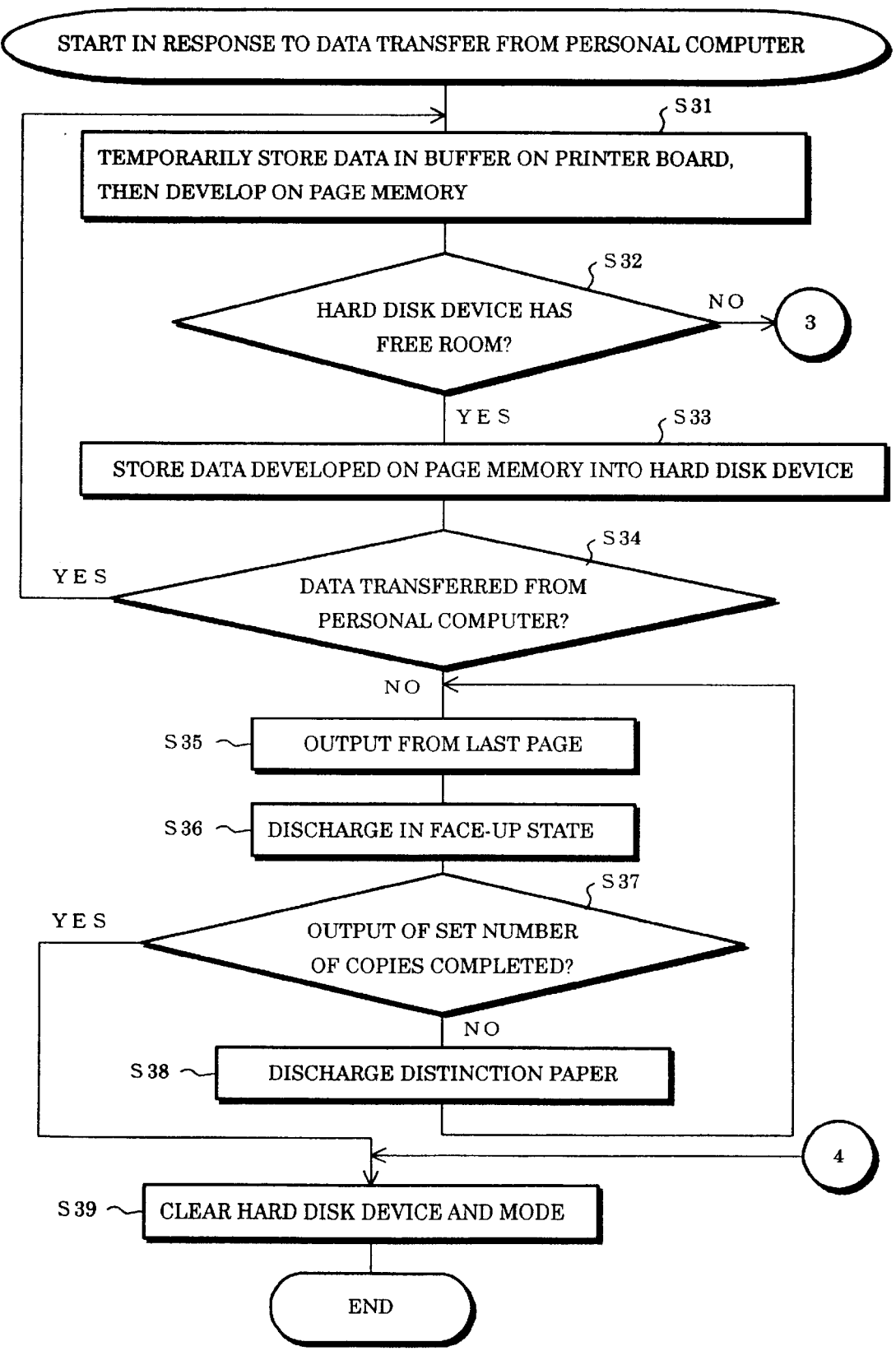
FIG. 12 is a flowchart of a process of output of image data in a digital copying machine as an example of an image output processing apparatus in accordance with another embodiment of the present invention.
Figure 13:
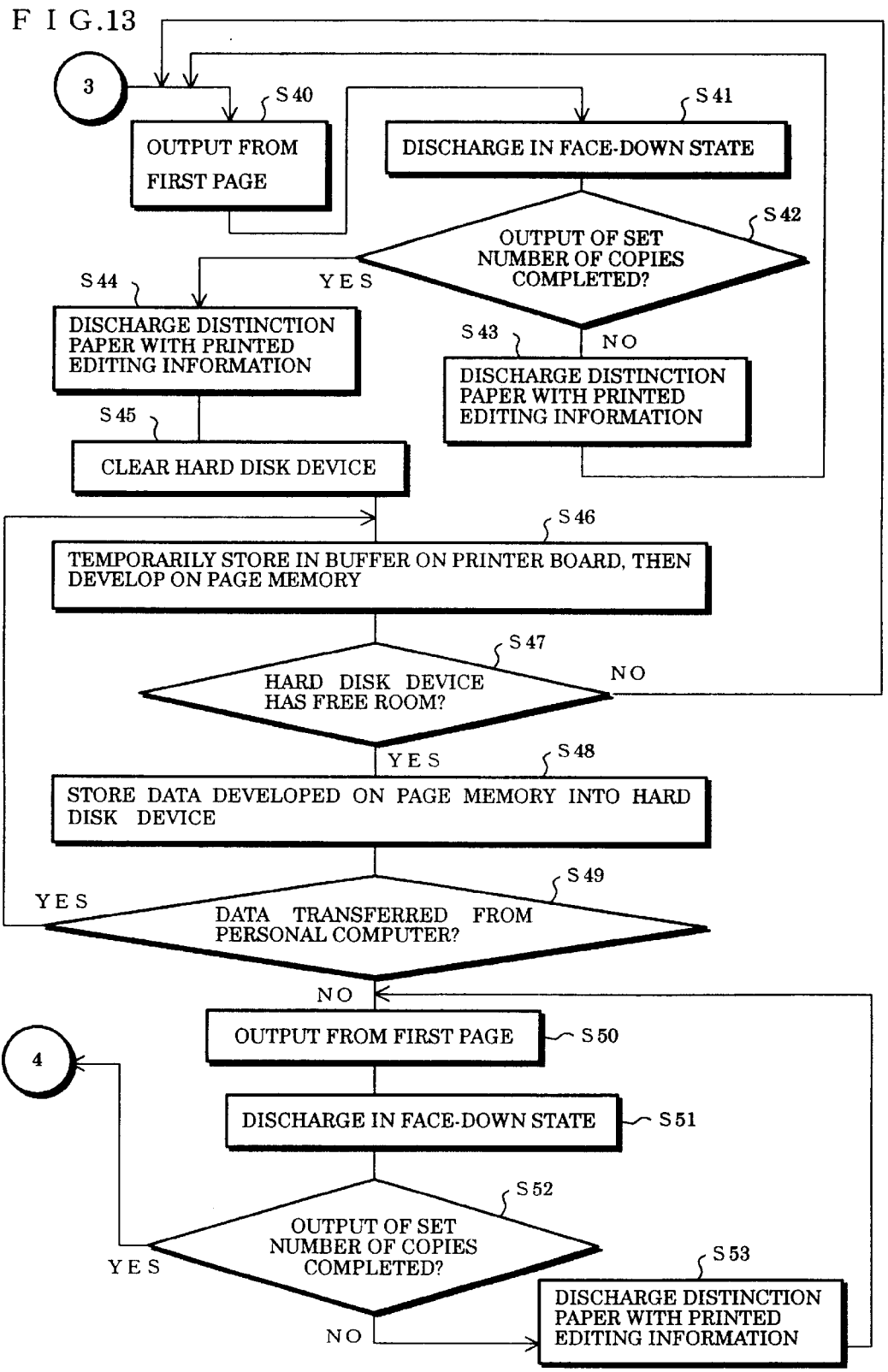
FIG. 13 is a flowchart continued from the flowchart of FIG. 12.

The operation of S31 through S39 in the flowcharts of FIGS. 12 and 13 is an operation in the single-block batch processing mode which is conducted in the case where the quantity of data transferred from the personal computer 2 is smaller than the capacity of disk memory of the hard disk device 503, and the foregoing steps except S38 are identical to S1 through S9 (except S8) in the flowcharts of FIGS. 1 and 2.

At S38, instead of the offsetting of the first discharge tray 341 as at S8, a distinction sheet S is discharged before the next set of sheets is outputted. With this, the distinction sheets S represent distinctions between sets of sheets. Here, since the single-block batch processing mode is adopted, editing information is not recorded on the distinction sheets S.

On the other hand, the operation of S40 through S53 is an operation in the plural-block split processing mode which is conducted in the case where the quantity of image data transferred from the personal computer 2 exceeds the capacity of disk memory of the hard disk device 503 thereby leading to capacity shortage, and the foregoing steps except S43, S44, and S53 are identical to S10 through S23 (except S13, S14, and S23) in the flowcharts of FIGS. 1 and 2.

At S43 and S53, instead of the offsetting as at S13 and S23 for putting a distinction between copies, a distinction sheet S with editing information printed thereon is discharged. At S44, instead of the offsetting for putting a distinction between blocks of image data, a distinction sheet S with editing information printed thereon is discharged. As a result, as shown in FIG. 14, for example, sets of sheets, not being offsetted, are piled on the second discharge tray 342.

Figure 14:
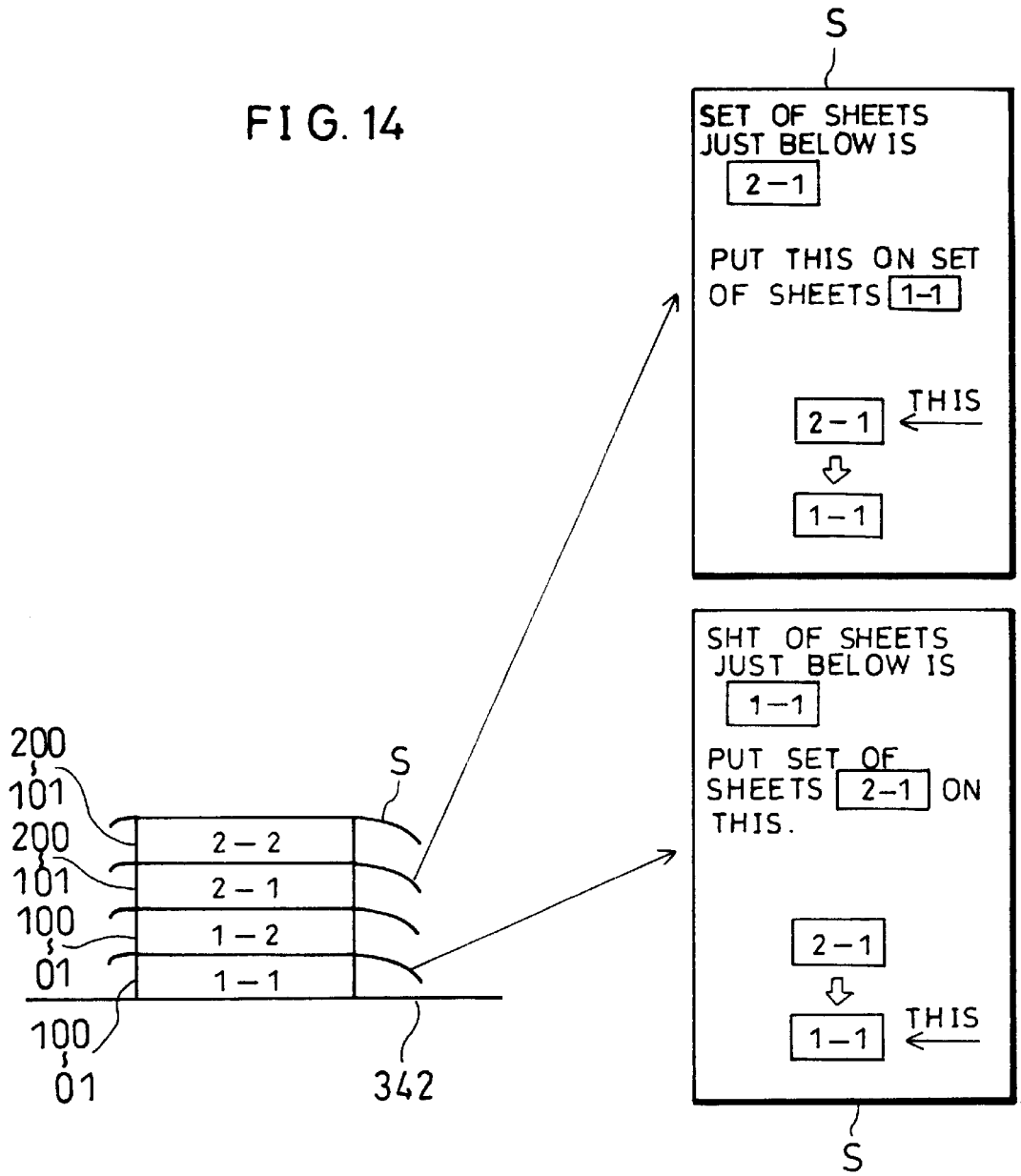
FIG. 14 is an explanatory view illustrating a state of editing information printed on a distinction sheet.

Examples of contents of editing information outputted on the distinction sheet S are shown in FIGS. 14 and 15. These exemplify a case where the number of copies is set to 2 and image data are divided into two blocks upon output.

As described above, the distinction sheet S has a size such that the distinction sheet S is not hidden under sheets piled thereon. In re-arranging the sets of sheets using the distinction sheets S as distinctions therebetween to edit the same, the user can easily and unmistakably re-arrange the sheets by checking with the editing information described on the distinction sheets S, thereby obtaining complete copies of a document.

Figure 16:
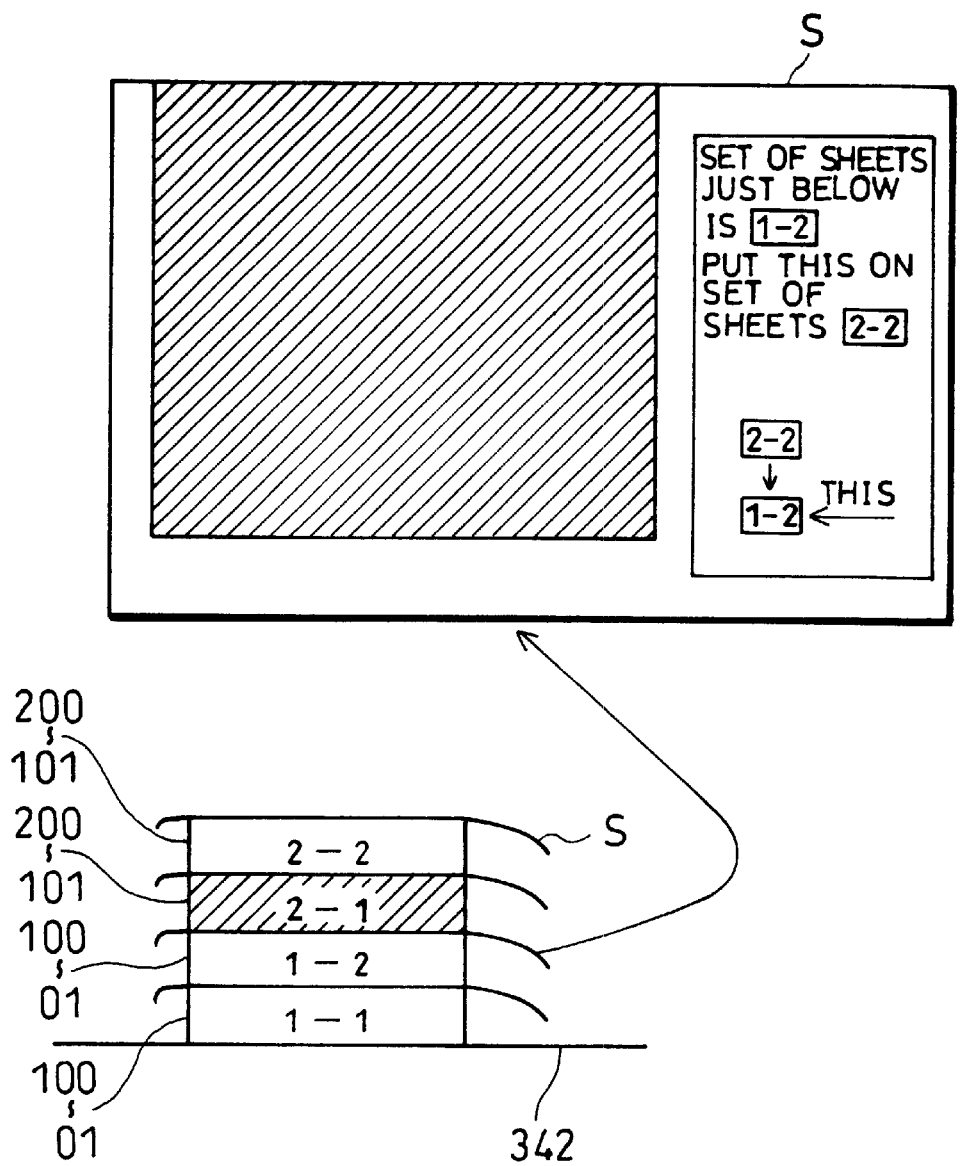
FIG. 16 is an explanatory view illustrating still another state of editing information printed on a distinction sheet.

Alternatively, as shown in FIG. 16, the editing information may be recorded on a part of the distinction sheet S which is not hidden under the sheets piled thereon. This enables the user to check with the editing information described on the distinction sheet S before starting the piled sheets re-arranging operation with use of the distinction sheets S as distinctions between sets of sheets, thereby making the editing operation easier and more unmistakable as compared with the case where the editing information cannot be seen before a set of sheets is moved.

Incidentally, in the case where image data are sequentially outputted form the top page and image-recorded sheets are sequentially discharged in the face-down state in which image-recorded surfaces face downward by using the switchback transport path 348 of the digital copying machine 1 as described above, the image-recorded surfaces of the discharged sheets face downward and the surfaces facing upward are blank.

Figure 17:
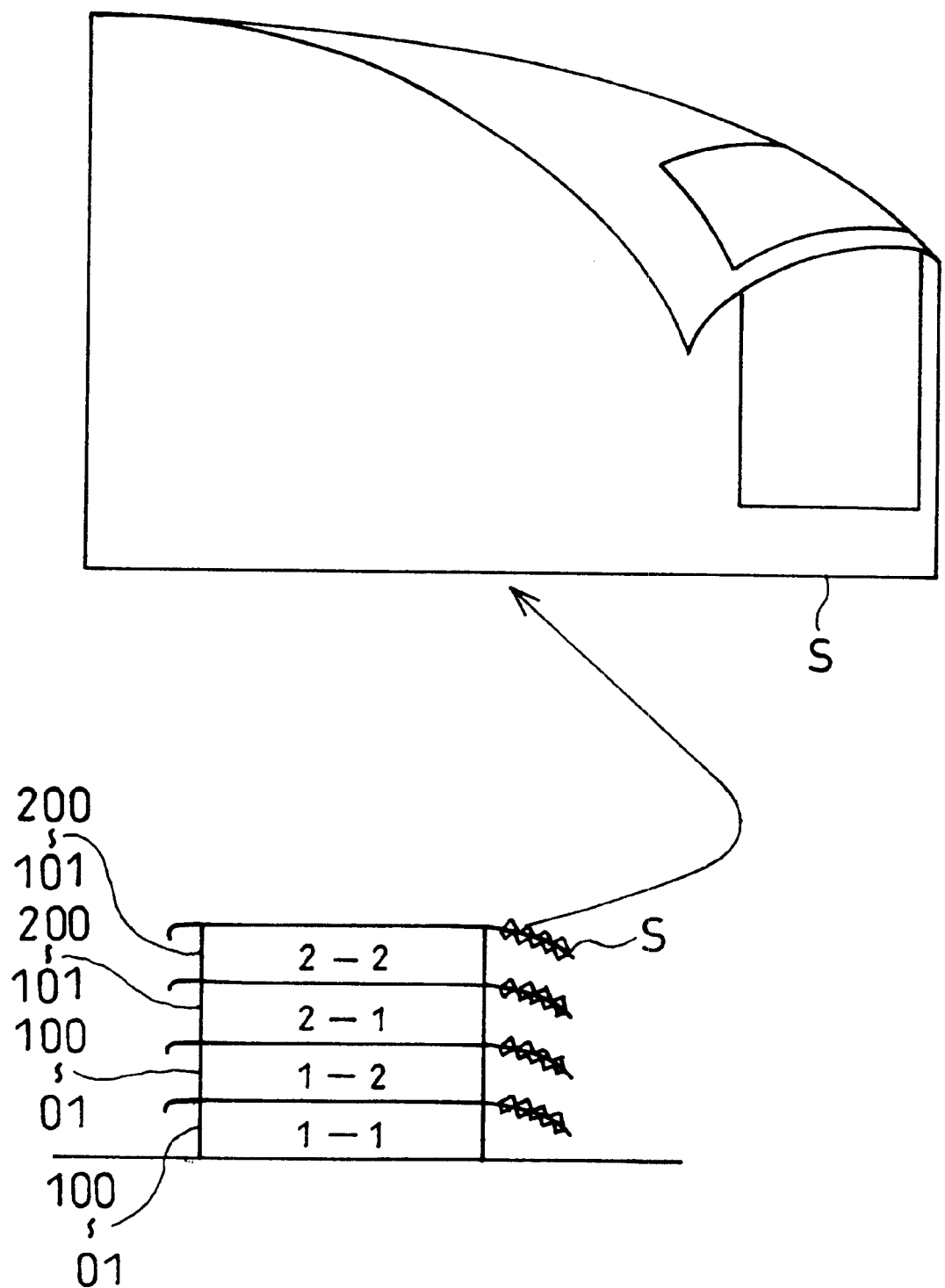
FIG. 17 is an explanatory view illustrating still another state of editing information printed on a distinction sheet.

Therefore, in an editing operation the user possibly turns over the entire sheets discharged on the second discharge tray 342 so that the image-recorded surfaces face upward. Taking the user's such action into consideration, it is preferable to record editing information on both surfaces of each distinction sheet S, as shown in FIG. 17.

Further, in the case where the sheets composing the sets of sheets have both surfaces image-recorded, the user likely turns over the sets of sheets. Therefore, in this case as well, it is preferable to record editing information on both surfaces of each distinction sheet S.

Here, editing information recorded on a front surface of the distinction sheet S differs from that recorded on a back surface of the same. This is explained with reference to FIGS. 18 and 19. For example, in the case where image data of pages 1–200 are divided into two blocks to be outputted and two copies are produced, two sets of sheets of pp. 1–100 are discharged in the face-down state, and thereafter, two sets of sheets of pp. 101–200 are likewise discharged in the face-down state, as described above.

Figure 18:
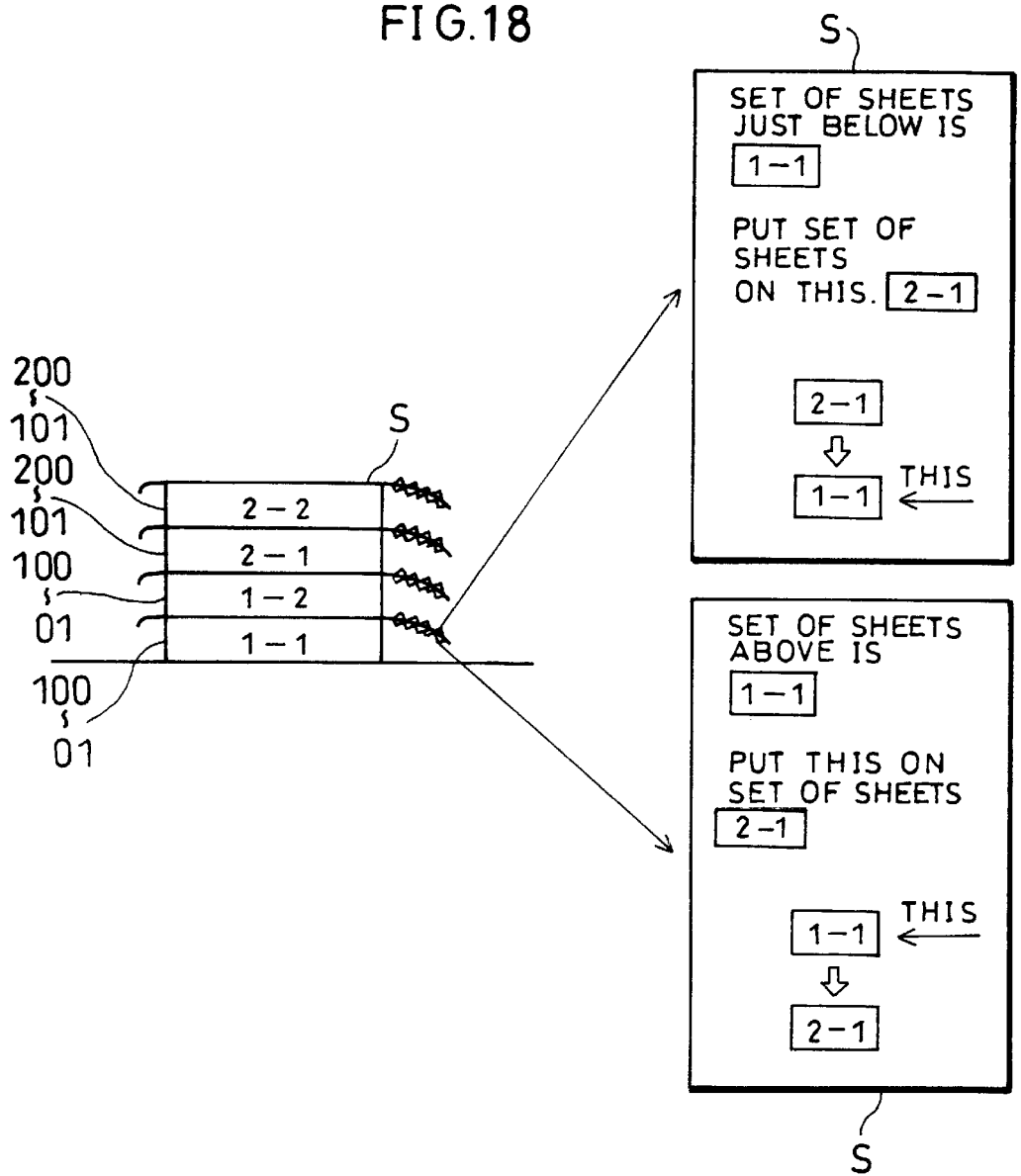
FIG. 18 is an explanatory view illustrating still another state of editing information printed on a distinction sheet.

Then, as the plural sets of sheets are edited in a state shown in FIG. 18, the set of sheets 2-1 (2-2) is placed on the set of sheets 1-1 (1-2), to complete one copy of a document.

Figure 19:
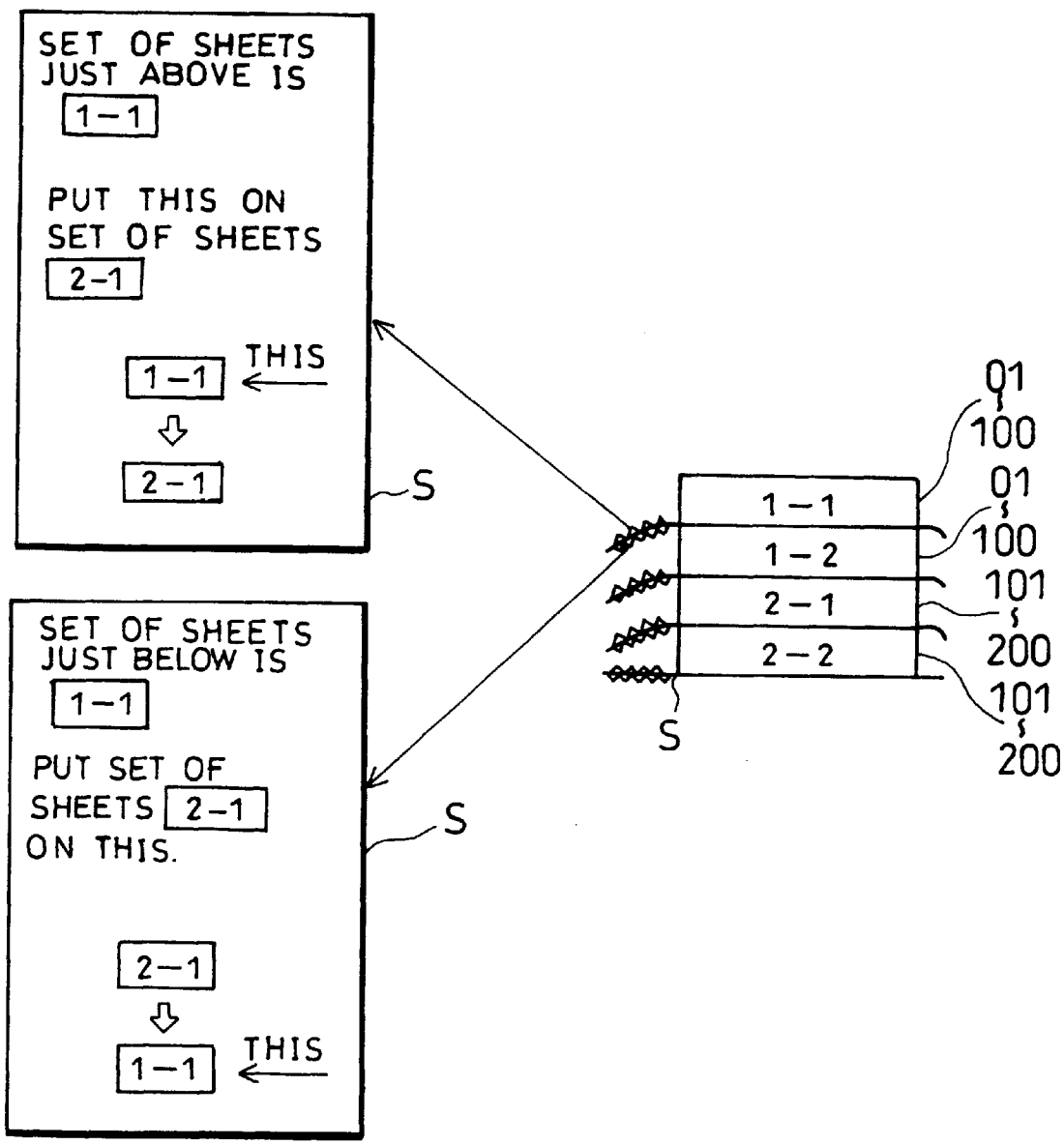
FIG. 19 is an explanatory view illustrating a state of sets of sheets of FIG. 18 in the case where they are turned over.

On the other hand, in the case where sheets discharged on the second discharge tray 342 are turned over so that image-recorded surfaces face upward as shown in FIG. 19 after completion of image output, the set of sheets 1-1 (1-2) is placed on the set of sheets 2-1 (2-2), to complete one copy of a document.

In other words, the editing method depends on which the image-recorded surfaces of the sheets face, either upward in the case where the sheets are edited in the same state when the sheets are discharged on the discharge tray 341 or 342, or downward in the case where the sheets are edited in a state in which the sheets are turned over after discharge. Therefore, the surfaces of editing information in accordance with a state of sheets (not turned over or turned over) is recorded on surfaces of the distinction sheets S which the user sees.

Incidentally, the foregoing explanation describes a method wherein editing information is recorded on each distinction sheet S, but another method may be alternatively applied, wherein only information for identifying each set of sheets, for example, which set of which block, is recorded on each distinction sheet S, and editing information for editing these plural sets of sheets is printed out by the laser recording section 32 after completion of output of all image data.

Incidentally, the editing information for editing the sets of sheets may alternatively be displayed on the LCD display section 104 of the manipulation panel 103, or a display of the personal computer 2 or the like.

[Third Embodiment]

Figure 21:
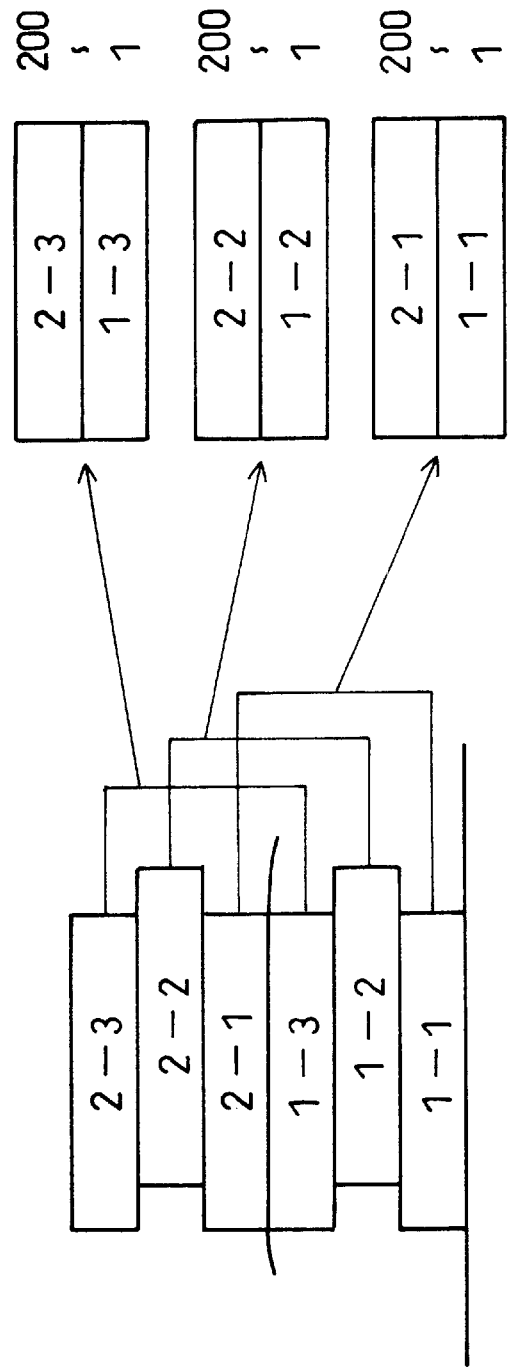
FIG. 21 is an explanatory view illustrating a state of output of option information outputted along with editing information.

The following description will explain still another embodiment in accordance with the present invention, while referring to FIGS. 20 and 21.

Incidentally, the members having the same structure (function) as those in the above-mentioned embodiments will be designated by the same reference numerals and their description will be omitted.

Again a digital copying machine (digital image forming apparatus) connected with an information processing device such as a personal computer, a digital video camera, a facsimile machine, etc. in a network environment is taken as an example.

The structure of the digital copying machine is substantially the same as that of the digital copying machine 1 of the foregoing first and second embodiments except that the digital copying machine of the present embodiment is designed as follows, for example: regarding the plural-block split processing mode in which image data are divided in a plurality of blocks to be outputted in case the capacity of disk memory of the hard disk device 503 is insufficient, use of the mode is recorded as history information, and in the case where the use of the mode is frequent, option information to improve processing efficiency such as recommendation for increasing the capacity of the hard disk device 503 is provided in addition to editing information.

Such history information management and supply of option information is carried out by the CPU 401 shown in FIG. 5.

FIG. 20 shows a management table of history information managed by the CPU 401. Here, the history information includes date of use and quantity of image data. Incidentally, since the history information may include anything as long as it is useful for management of information on the processing operation of dividing image data into plural blocks upon output of images, the history information is not limited to date of use and quantity of image data but can be made more effective by including other information. For example, by making the digital copying machine 1 count all the number of times image data are outputted and adding the information to the history information, the rate of the plural-block split processing in all the output processing can be found.

The CPU 401 confirms the frequency of use referring to the history information, and when it judges the frequency of use of the plural-block split processing mode is high, option information regarding, among system options, those for improvement of efficiency in printing data are outputted to be shown to the user.

Since the option information is shown in addition to editing information, it is easily understood by the user, and hence, effective.

Incidentally, apart from this, history information managed by the history information management table may be displayed on the LCD display section 104 of the operational panel 103 of the digital copying machine 1 in response to manipulation by a service man at his request, or the option information may be printed out by the laser recording section 32 in response to manipulation by a service man at his request, so that the service man can recommend the user to increase the capacity of the hard disk device 503.

The option information outputted along with editing information is not limited to recommendation for extension of the hard disk device 503, but other option information for extension of processing capability of the apparatus can be outputted.

With this, the user can upgrade the system of the digital copying machine 1 as required.

[Fourth Embodiment]

The following description will depict still another embodiment in accordance with the present invention, while referring to FIGS. 3, and 22 through 36.

Incidentally, the members having the same structure (function) as those in the above-mentioned embodiments will be designated by the same reference numerals and their description will be omitted.

Again a digital copying machine (digital image forming apparatus) connected with an information processing device such as a personal computer, a digital video camera, a facsimile machine, etc. in a network environment is taken as an example.

The structure of the digital copying machine is substantially the same as that of the digital copying machine 1 of the foregoing first, second, and third embodiments, and the digital copying machine of the present embodiment, like the digital copying machine 1, assumes the plural-block split processing mode in the case where the electronic RDH function in the copy mode is used or in the case where data of a quantity exceeding the capacity of disk memory of the hard disk device 503 are transferred from an external networked device such as the personal computer 2.

In so doing, the digital copying machine of the present embodiment devise is, as will be described afterwards, characterized in innovative provision of borders between blocks of image data according to instructed output conditions of outputted images, for example, duplex recording mode, so that copies of a document in accord with output conditions can be obtained even in the case of image data divided into blocks.

The following description will depict division into blocks in the case where the duplex recording mode is instructed.

In the case where the duplex recording mode is instructed, in dividing image data into blocks, image data to be recorded on a front surface and a back surface of a same sheet of paper should not be separately allocated to different blocks. In other words, the number of pages of image data included in one block has to be a multiple of 2.

Figure 22:
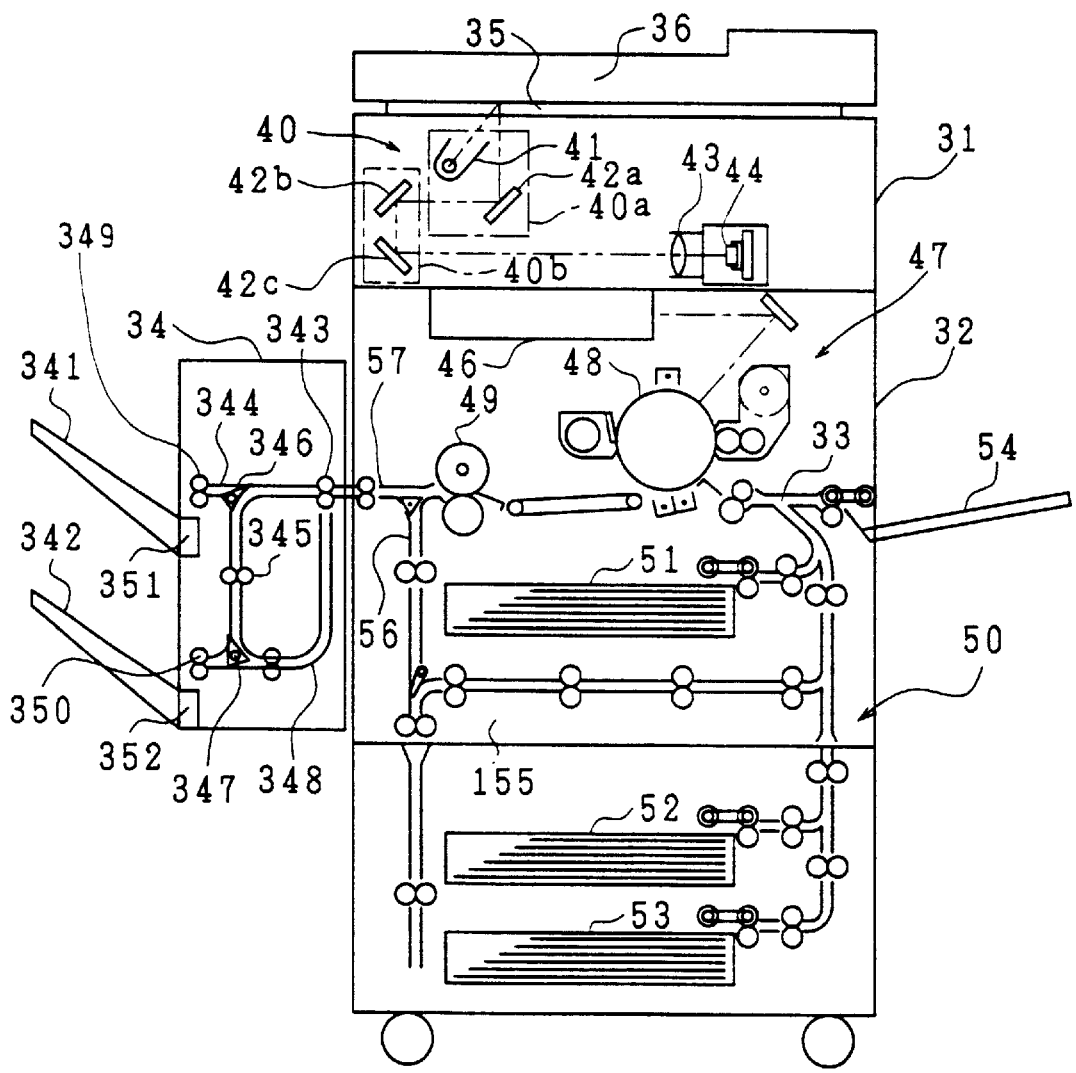
FIG. 22 is a cross-sectional view illustrating a structure of a digital copying machine in accordance with still another embodiment of the present invention.

Regarding a structure of a duplex unit in the digital copying machine, there are the following two types: an intermediate tray type, like the duplex unit 55 as shown in FIG. 3, in which sheets having images on first surfaces thereof are temporarily housed in an intermediate tray and thereafter sequentially supplied to the laser recording section 32 again for recording images on second surfaces thereof; and a sheet transport path type, like a duplex unit 155 as shown in FIG. 22, in which sheets having images on first surfaces thereof are, not being stopped, sequentially supplied to the laser recording section 32 again for recording images on second surfaces thereof.

How sheets are transported in the duplex unit 55 of the intermediate tray type (a case of a single sheet and a case of plural sheets) is shown in FIGS. 26(a) through 26(g) and 27(a) through 27(h), and how sheets are transported in the duplex unit 155 of the sheet transport path type is shown in FIGS. 29(a) through 29(f) and 30(a) through and 30(g).

In the case of the duplex unit 55 of the intermediate tray type, the limit M of the number of sheets housed in the unit 55 is preliminarily determined. Therefore, the operation for storing image data into the hard disk device 503 has to pause when images equivalent to twice (due to duplex recording) the limit M are read in, even if the hard disk device 503 still has free room.

In the case of the duplex unit 155 of the intermediate tray type, the limit L of the number of the number of sheets continuously transported in the transport path is preliminarily determined depending on the length of the transport path and the sheet size. Therefore, room in the hard disk device 503 has to be checked when images equivalent to twice the limit L (due to duplex recording) are read in, and the operation for storing image data into the hard disk device 503 has to pause when next storing of image data equivalent to twice the limit L is judged to be impossible.

Figure 23:
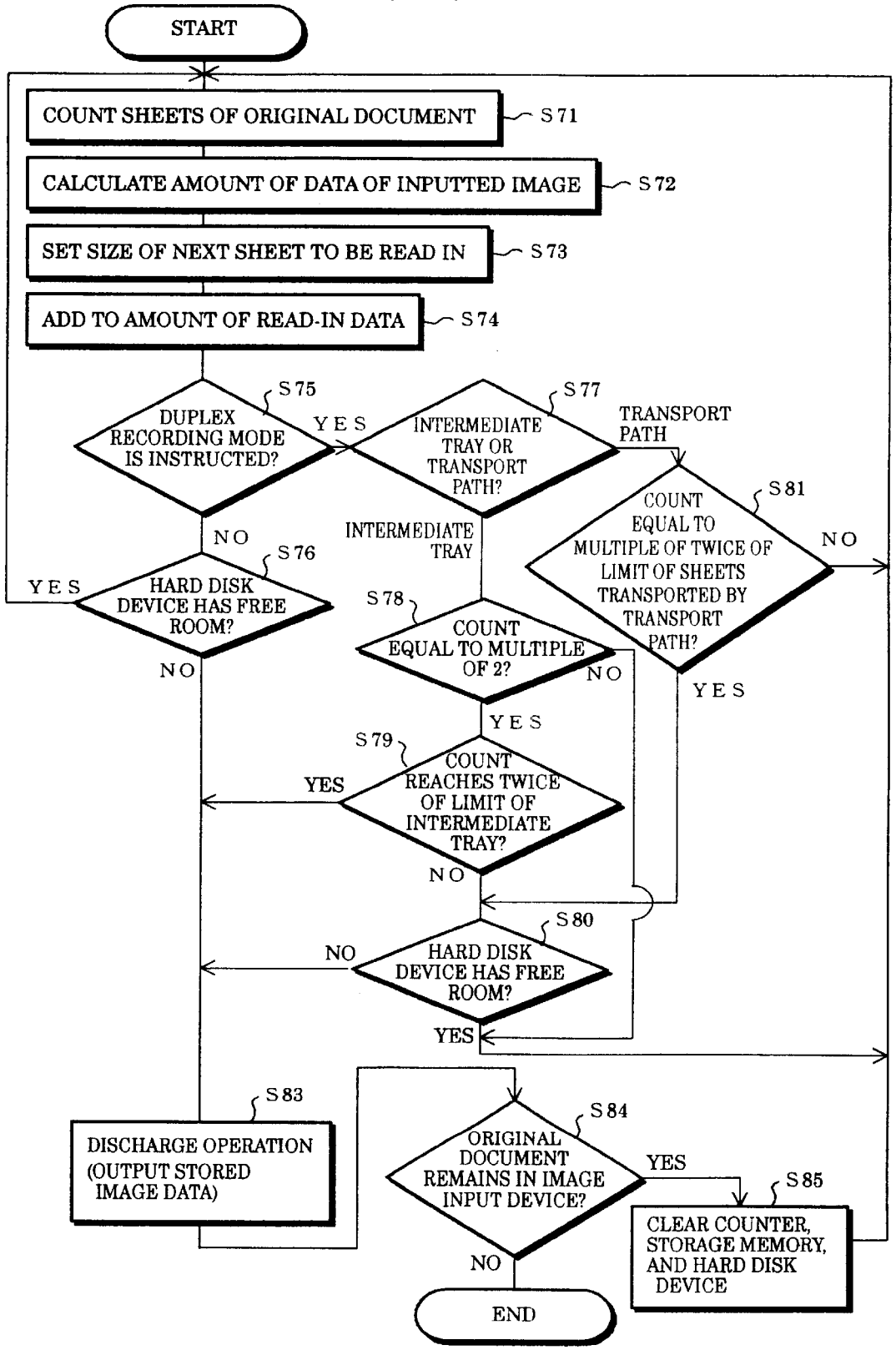
FIG. 23 is a flowchart of a judging operation in block dividing processing in the case where a duplex recording mode is instructed.

A judging operation for judging whether or not the operation for storing image data into the hard disk device 503 should pause is shown in the flowchart of FIG. 23. Note that here a case where a massive document is read with use of the RADF 36 is taken as an example.

In judgement, first the number of sheets of an original document to be inputted is counted (S71), and next a quantity of the data of the original document images is calculated based on size information of the original document (S72). Then, the quantity of data is added in a store memory (S74). In the store memory, a total data quantity of the original document measured by the counter is stored.

Image data of a read-in sheet of the original document are inputted through the CCD board 300 shown in FIG. 5, and once inputted via the main image processing board 400 to the memory section 502 of the sub image processing board 500, then transferred to the hard disk device 503. Every time a sheet of the original document is inputted, data thereof are accumulated in the hard disk device 503.

At S73, a size of a next sheet of the original document having been sent to the original document platen 35 is set in a memory. This is because the size of the next sheet is necessary in judgment on whether or not the hard disk device has sufficient capacity to read in the next sheet (group of sheets) of the original document.

Subsequently, whether or not the duplex recording mode is instructed is judged (S75), and if not, the flow proceeds to S76, at which image data are divided according to the free room of the hard disk device 503 alone.

More specifically, by comparing the capacity of the hard disk device 503 and the data quantity stored in the store memory, it is judged whether or not the hard disk device 503 has sufficient free room for the data quantity of the next original document image data. In the case where it has sufficient free room, the flow returns to S71, at which the reading of the next original document image and the storing of data in the hard disk device 503 is carried out. In the case where it does not have sufficient free room, the image data stored in the hard disk device 503 are outputted (S83). Thereafter, the counter for the number of sheets of the original document to be inputted, the store memory, and the hard disk device 503 are cleared at S85, and the flow returns to S71, at which reading of image data of the next block is started. If it is judged at S84 that the RADF 36 has no more sheet of the original document to supply, this processing operation ends.

On the other hand, in the case where the duplex recording mode is instructed, the type of the duplex unit is judged at S77, and the flow proceeds to S78 in the case where it is the intermediate tray type, whereas the flow proceeds to S81 in the case where it is the sheet transport path type.

In the case of the duplex unit 55 of the intermediate tray type, whether or not the number of sheets of an original document to be inputted is a multiple of 2 is judged at S78. This is because original document data are managed, in the case of the duplex recording mode, with two pages being regarded one pair. In the case where the number is not a multiple of 2, the flow returns to S71, at which the next sheet of the original document is read.

In the case where the number is a multiple of 2 , the flow proceeds to S79, at which it is judged whether or not a count reaches twice the limit M of sheets dealt with by the duplex unit 55. If the count does not reach it, free room of the hard disk device 503 is checked at S80, and if there is no problem, the flow returns to S71, at which the next sheet of the original document is read.

On the other hand, if the count reaches twice M, the image data stored in the hard disk device 503 are outputted (S83), and the flow returns to S71 after the counter for the number of inputted sheets of the original document, the store memory, and the hard disk device 503 are cleared. At S71, reading of image data of the next block is started.

If, before the count reaches twice M, it is judged at S80 that the hard disk device 503 has insufficient free room to store image data equivalent to next two pages, the image data stored in the hard disk device 503 are outputted (S83), and then, the counter for the number of inputted sheets of the original document, the store memory, and the hard disk device 503 are cleared at 85. Thereafter, the flow returns to S71, at which reading of image data of the next block is started.

After that, if it is judged at S84 that the RADF 36 has no more sheets of the document to supply, the processing operation ends.

The checking at S80 of the capacity of the hard disk device 503 in the case of the duplex unit of the intermediate tray type is based on an assumption that the hard disk device 503 has to have free room not smaller than twice the data quantity of the next sheet of the document in a size set at S73. This is because, in the duplex recording mode, when data of the first sheet are read, room for data of the second sheet has to be secured.

On the other hand, in the case of the duplex unit 155 of the sheet transport path type, it is judged at S81 whether or not the number of sheets of an original document inputted is a multiple of 2L, L being the limit of sheets continuously transported in the transport path. If not, the flow proceeds to S71, and document image reading is carried out until the number becomes a multiple of 2L. This is because in the sheet transport path type, duplex recording is conducted by dealing with 2L sheets as one unit.

When the number becomes a multiple of 2L, by comparing the capacity of the hard disk device 503 and the data quantity stored in the store memory, it is judged at S80 whether or not the hard disk device 503 has sufficient free room for the data quantity of the next original document image data. In the case where it has sufficient free room, the flow returns to S71, at which the reading of the next original document image is carried out. In the case where it does not have sufficient free room, the image data stored in the hard disk device 503 are outputted (S83). Thereafter, the counter for the number of inputted sheets of the original document, the store memory, and the hard disk device 503 are cleared at S85, and the flow returns to S71, at which reading of image data of the next block is started.

Then, as in the aforementioned case, image data are divided into blocks and outputted, until it is judged at S84 that the RADF 36 has no more sheets of the document to supply. Then, the processing operation ends.

In the case where the duplex unit is the sheet transport path type, sheets of an original document are transported by dealing with 2L sheets as a unit, and therefore, in the checking of the capacity of the hard disk device 503 at S80, whether or not reading of 2L sheets is possible is judged.

Next explained is, with reference to FIGS. 24 through 28, the transport of sheets and the processing of image data in a digital copying machine having a duplex unit 55 of the intermediate tray type in the case where original document images are read based on the judgment as shown in the flowchart of FIG. 23.

First described is the single-block batch processing mode in which image data are temporarily stored in the hard disk device 503, and the transport of sheets is started based on the foregoing judgment.

Figure 24:
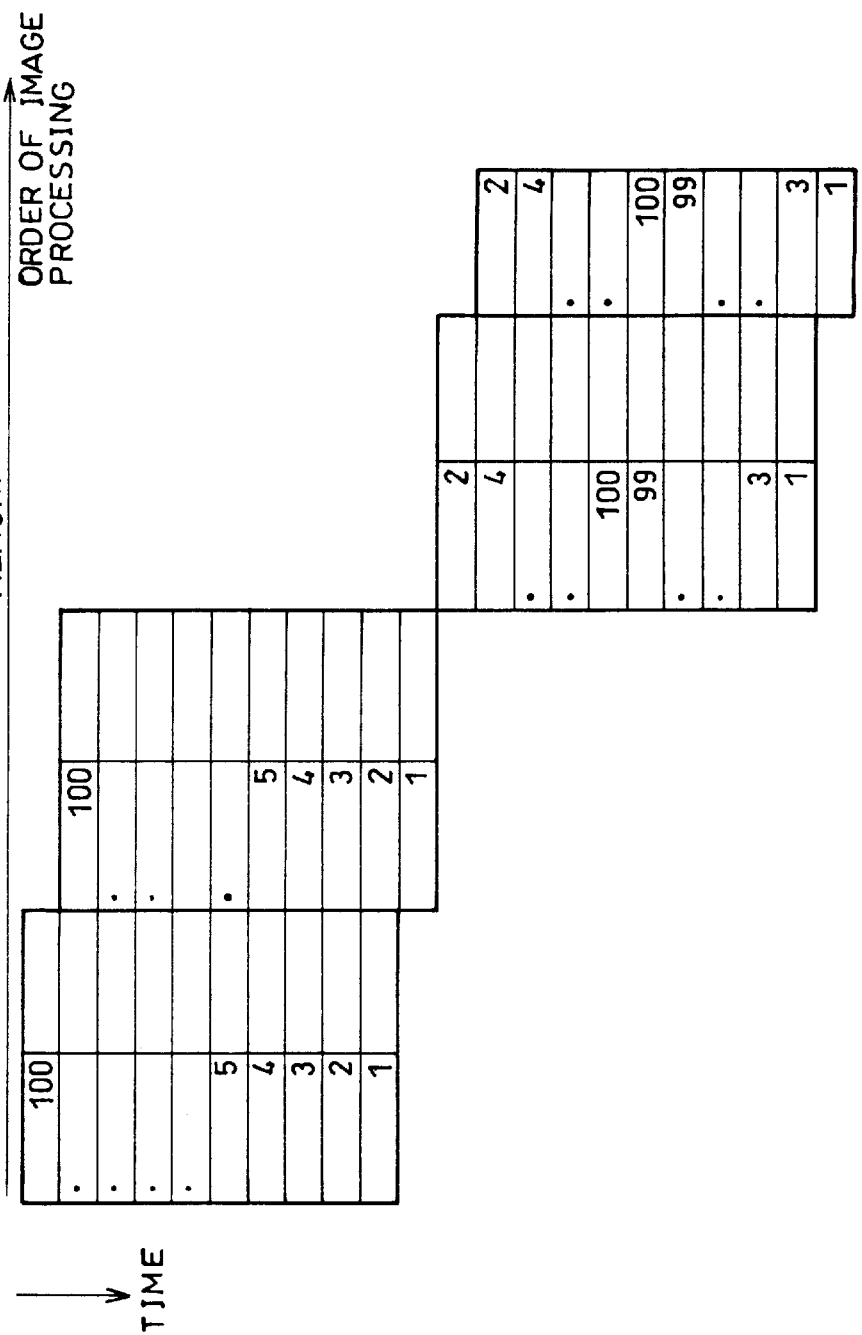
FIG. 24 is a view showing an image processing operation in a single-block batch processing mode in the case of a duplex unit of an intermediate tray type.
Figure 27A:
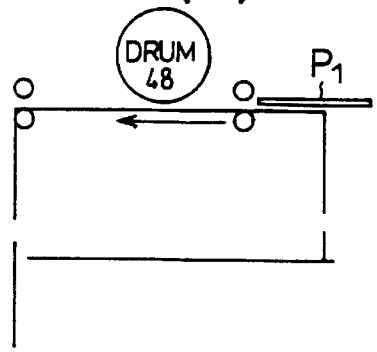
FIGS. 27(a) through 27(h) are views showing transport of plural sheets in the case where the duplex unit of the intermediate tray type.
Figure 27B:
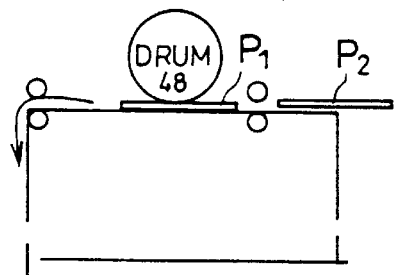
Figure 27C:
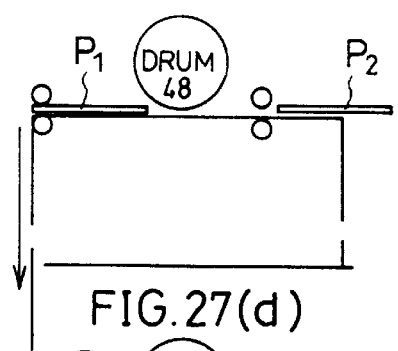
Figure 27D:
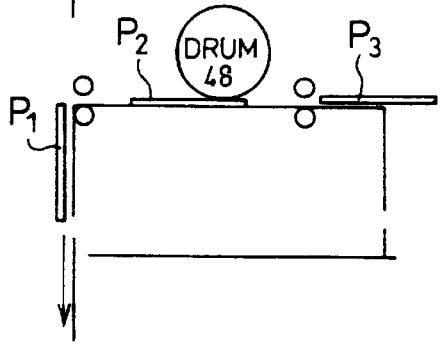
Figure 27E:
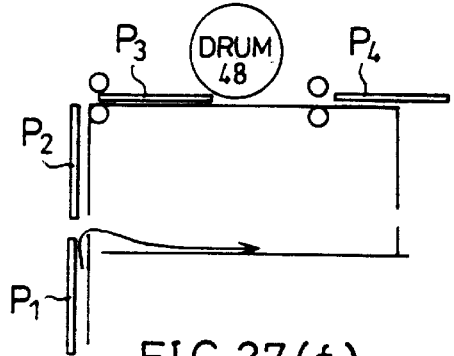
Figure 27F:
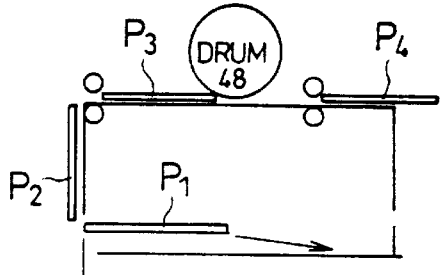
Figure 27G:
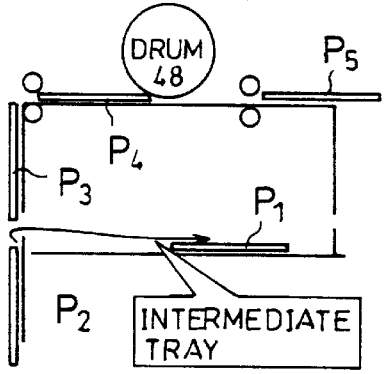
Figure 27H:
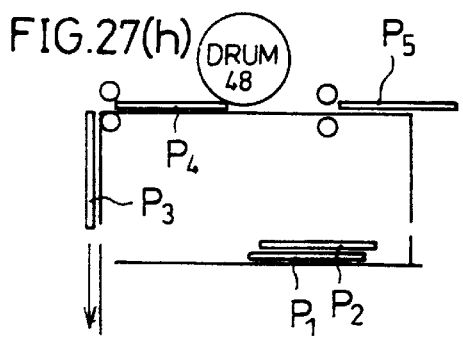

As described above, an image data input operation and an operation for recording image data on sheets are carried out separately in terms of time, as shown in FIG. 24. Here, the transport of sheets starts after image data are stored in the hard disk device 503.

Since the number of sheets of read-in image data has been already found to be either 2M or not more than 2M (by the operation at S79), the number of sheets supplied to the duplex unit 55 by no means exceeds the limit number. Regarding images in the case of duplex copying, one ID table engaged in sheet management and image IDs of both sides, that is, front ID and back ID, are registered in an image ID management table shown in FIG. 25 which is controlled by the CPU 401 of the main image processing board 400 shown in FIG. 5, so that output from the hard disk device 503 at the start of the sheet transport is controlled.

For example, in the case where there are 100 sheets of images and the limit of sheets treated by the duplex unit 55 is 50, images on pages 2, 4, 6, . . . 100 are recorded in this order on sheets and enter the duplex unit 55. FIGS. 26(*a*) through 26(*g*) and 27(*a*) through 27(*h*) show the move of sheets.

Sheets housed in the duplex unit 55 are discharged from the sheet on which p. 100 is recorded, and images are recorded thereon in an order from p. 99, p. 97, . . . p. 1, which are then discharged to the post-processing device 34. After completion of discharge, the duplex unit 55 prepares for the next input operation. Then, the same operation as that above described is repeated until the duplex unit 55 has no more sheet of the original document to supply.

Next described is an operation depending on judgment in the case where the capacity of the hard disk device 503 has a limit of 51 pages (plural-block split processing mode).

Figure 28:
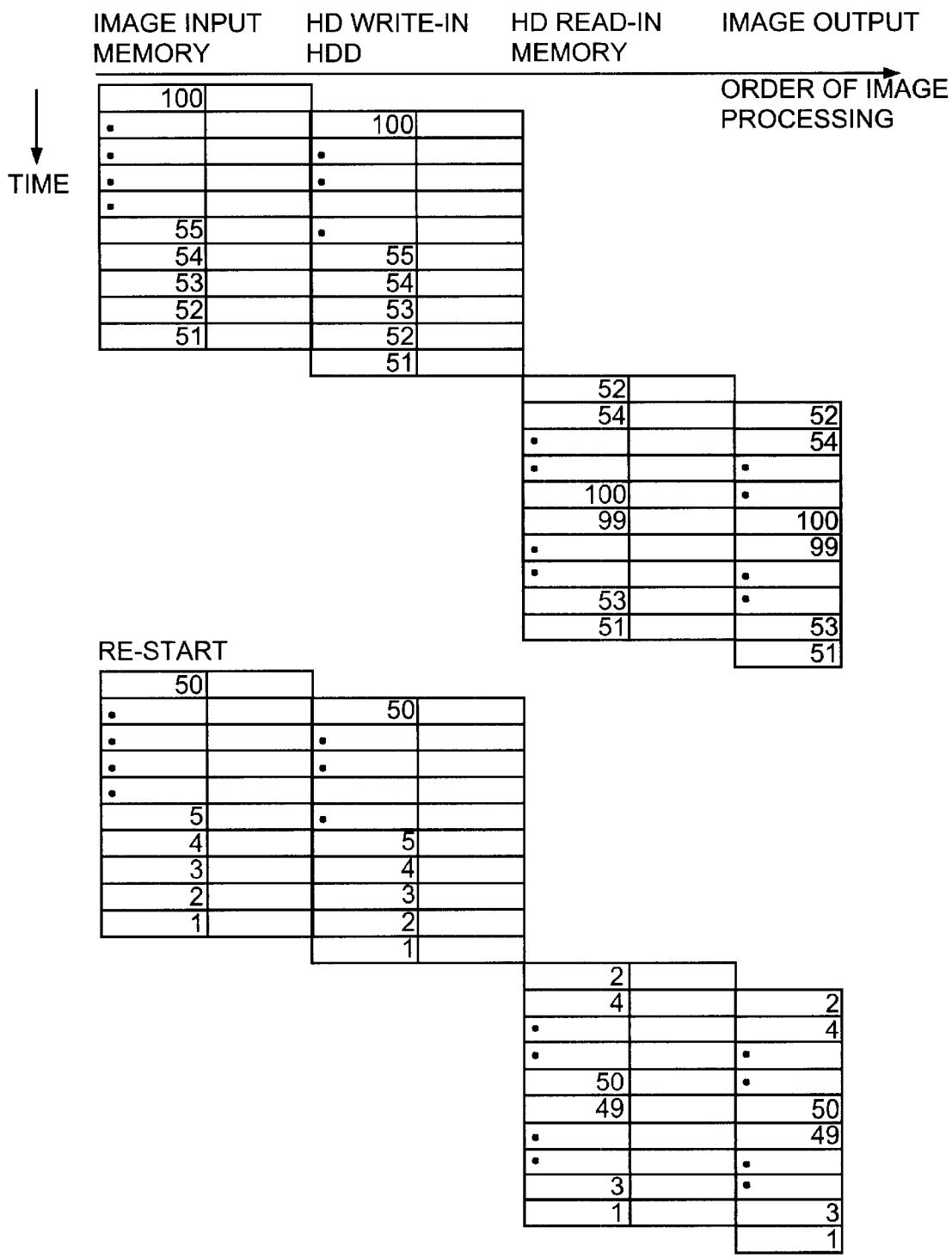
FIG. 28 is a view showing an image processing operation in a plural-block split processing mode in the case of the duplex unit of the intermediate tray type.
Figure 29A:
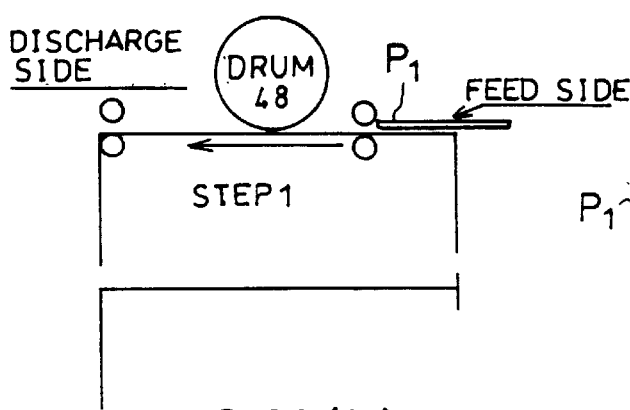
FIGS. 29(a) through 29(f) are views showing an image processing operation in the case of a duplex unit of a sheet transport path type.
Figure 29B:
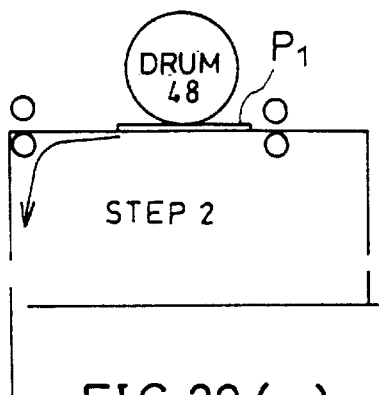
Figure 29C:
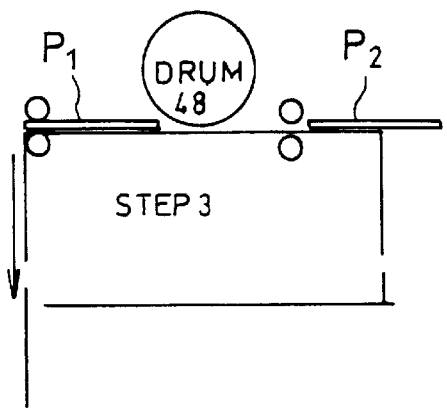
Figure 29D:
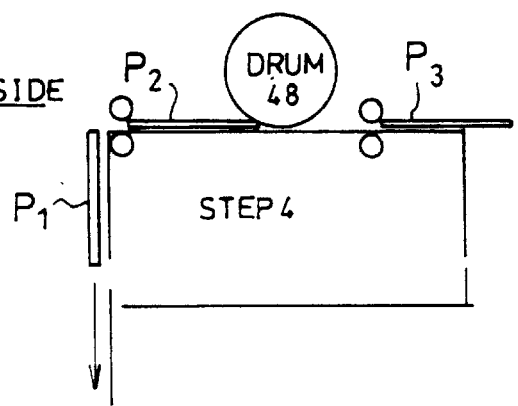
Figure 29E:
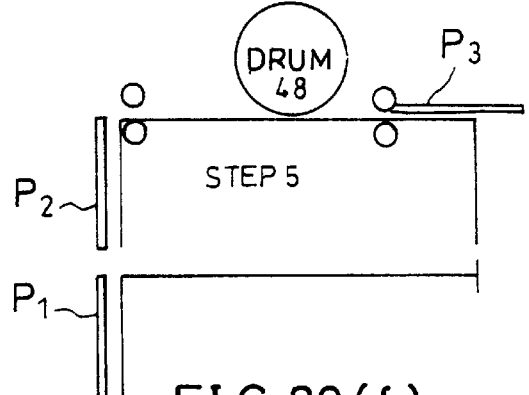
Figure 29F:
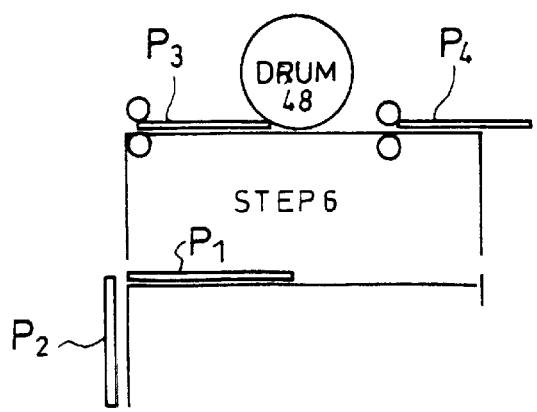

As shown in FIG. 28 illustrating the operation, when images on 48th sheet of the original document are read, the flow returns to S71 according to judgment at S80 in the flowchart of FIG. 23, and images of two pages of the original document are read. This makes the hard disk device 53 still have free room for one page, which is however insufficient for two pages required for the duplex operation. Therefore, the flow proceeds to S83, at which the discharging operation starts.

Thereafter, image data are read out in a predetermined order from the memory section 502 in the hard disk device 503 shown in FIG. 5, and are recorded on sheets. In the case where data for the back surfaces of the sheets are recorded first, the reading of even pages is carried out in an order from p. 52, p. 54, . . . , and the image-recorded sheets are stored in the duplex unit 55. When the reading and recording is finished till p. 100, the sheets are taken out of the duplex unit 55. When the sheets are discharged, the sheet having entered last is discharged first, and images for the odd pages are read from the hard disk device 503 and recorded on surfaces of the sheets in an order from p. 99, p. 97 . . . When this operation is finished till p. 51, then ends the recording operation for recording image data which are the first block of image data stored in the hard disk device 503.

Subsequently, read-in resumes, and the same processing operation is carried out while judgement is performed. In so doing, images on both surfaces are read not to a full capacity of the hard disk device 503, thereby ensuring that the processing operation is continuously performed without causing over-capacity of the hard disk device 503.

Figure 31:
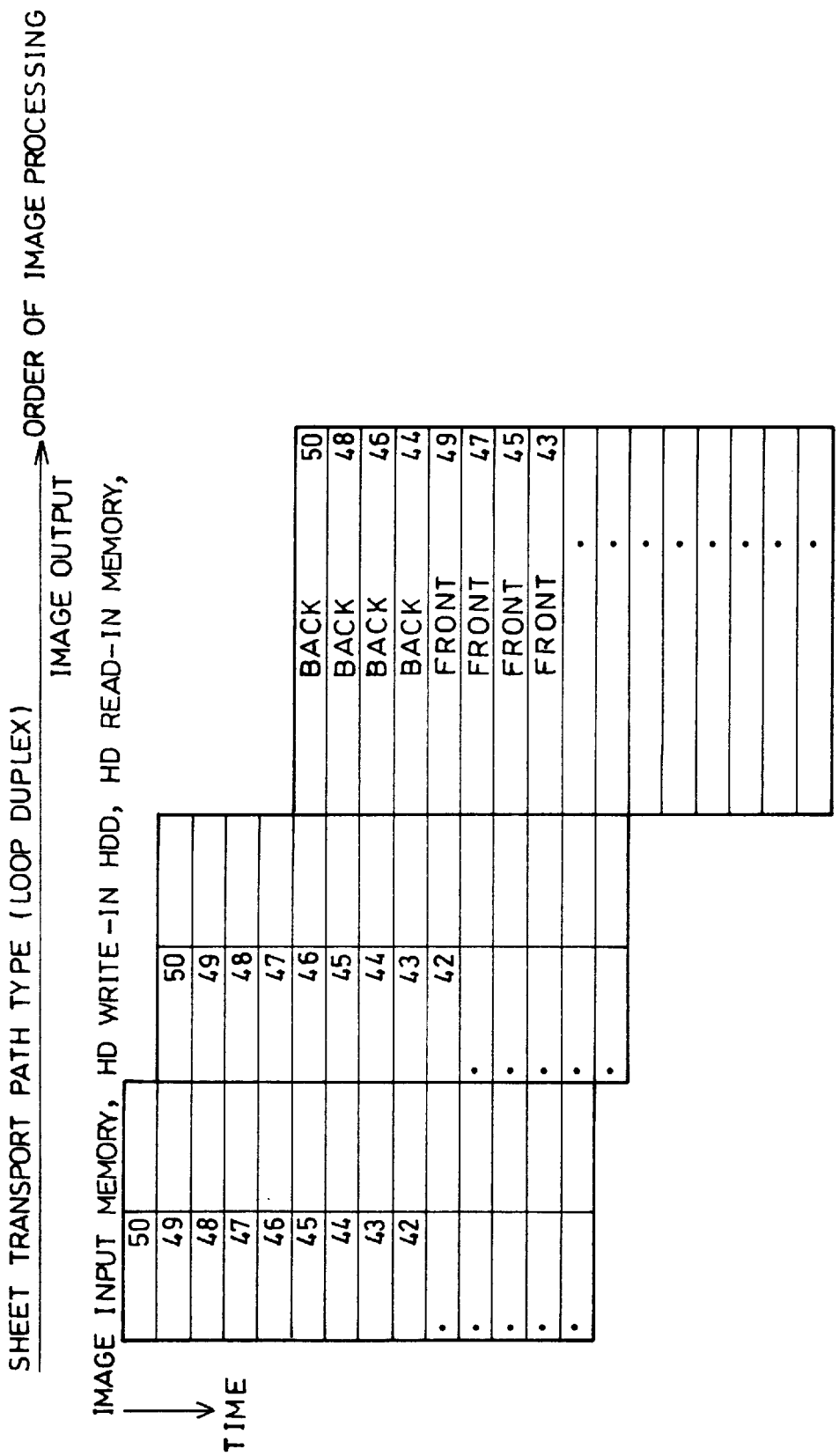
FIG. 31 is a view showing an image processing operation in the case of the duplex unit of the sheet transport path type.

Next explained is, with reference to FIGS. 29 through 31, the transport of sheets and the processing of image data in a digital copying machine having a duplex unit 155 of the sheet transport path type in the case where original document images are read based on the judgment as shown in the flowchart of FIG. 23.

As described above, in the case of the duplex unit 155 of this type, assuming that the number of sheets accepted by the sheet transport path is L, the limit of read-in of images is either a capacity of the hard disk device 503 or the image capacity of 2L sheets, whichever smaller. Further, assuming that 4 sheets are accepted by the sheet transport path, images on these sheets are equivalent to 8 pages. Therefore, input of data is controlled, regarding 8 pages as a unit.

More specifically, when images are inputted, whether or not input of images for 8 pages is possible is judged by comparing the quantity of image data with the limit, and if there is sufficient room, input is allowed up to 8 pages. Then, a point of judgment is changed so that the next judgment is performed when the 8 pages are inputted.

FIG. 31 illustrates the processing of image data, and FIGS. 29(*a*) through 29(*f*) and 30(*a*) through 30(*g*) illustrate the transport of sheets.

As described above, by making a pause to the input operation of image data according to judgment based on an amount of one transport unit and room in the hard disk device 503 for storing image data, division of image data into blocks is efficiently carried out in the case where massive image data is to be inputted. In result, it is possible to reinforce the judgement only based on the capacity of the hard disk device 503, which judgment is unable to judge efficiency in recirculation transport.

The following description will explain division of image data into blocks in the case where a post-processing mode for post-processing image-recorded sheets with the post-processing device 34 is instructed.

Incidentally, apart from such a type as shown in FIG. 3 which is capable of switching between face-up discharge and face-down discharge, the post-processing device 34 may be a sheet binding device (for example, a stapler) which houses image-recorded sheets and binding sets of sheets, or a sheet sorting device (for example, a sorter) for sorting image-recorded sheets and finishing them into a plurality of sets of sheets. Regarding each case, the block dividing scheme will be explained, along with transport of sheets in each case.

First, a sheet binding mode and division of image data into blocks will be explained, with reference to a flowchart of FIG. 32.

Figure 32:
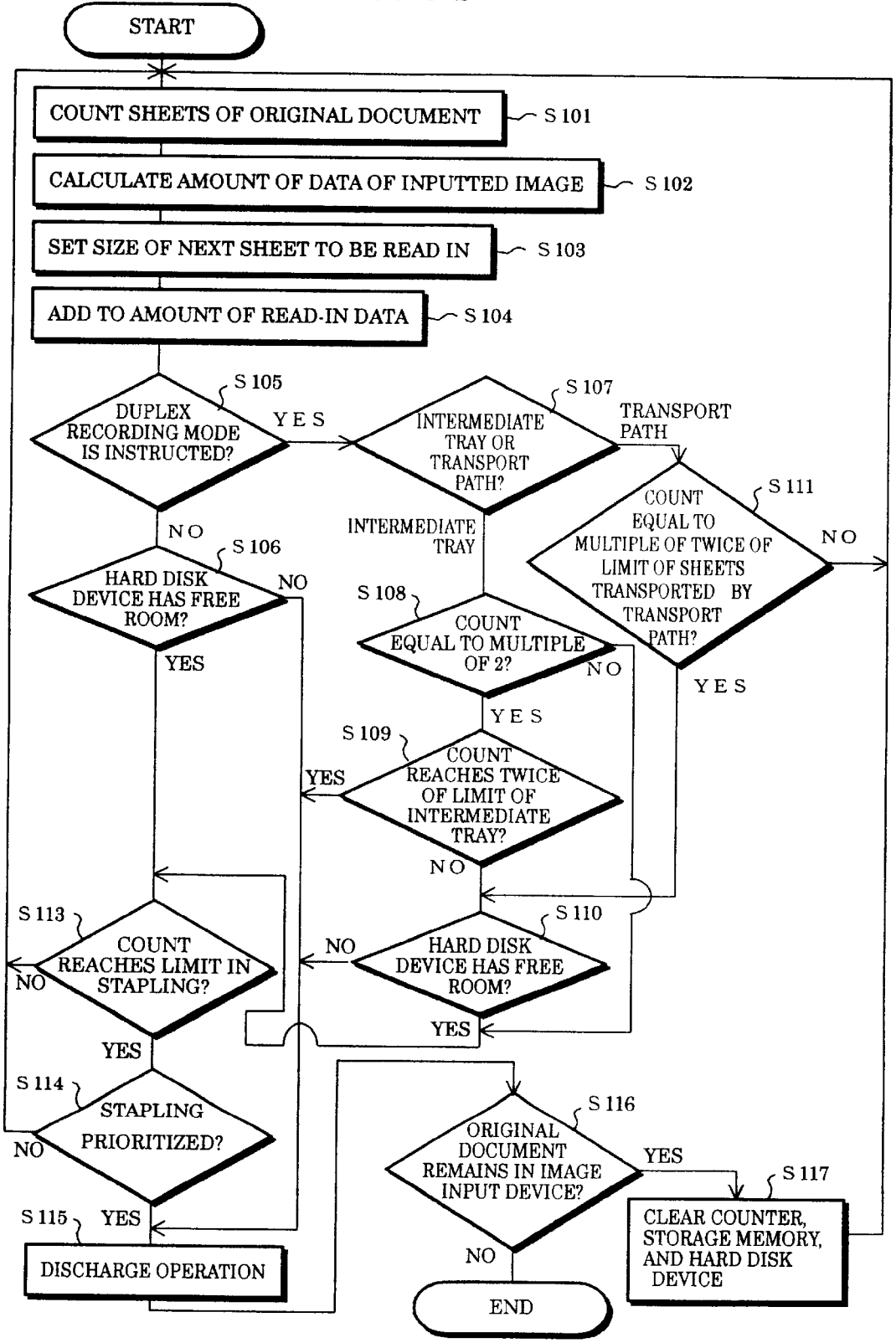
FIG. 32 is a flowchart of a judging operation in the plural-block split processing in the case where a sheet binding mode is instructed.
Figure 33A:
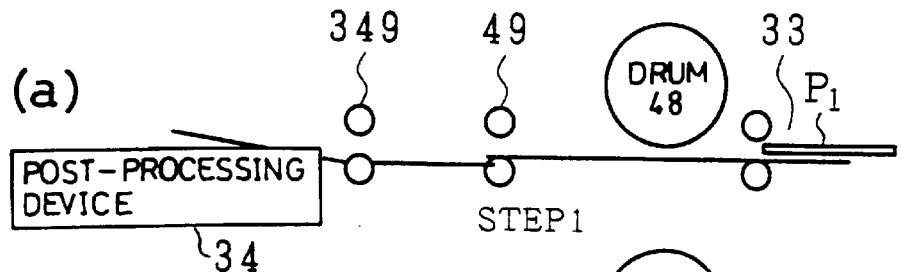
FIGS. 33(a) through 33(f) are views showing transport of sheets in the case where the sheet binding mode is instructed.
Figure 33B:
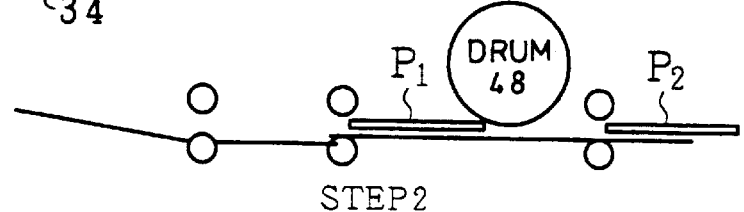
Figure 33C:
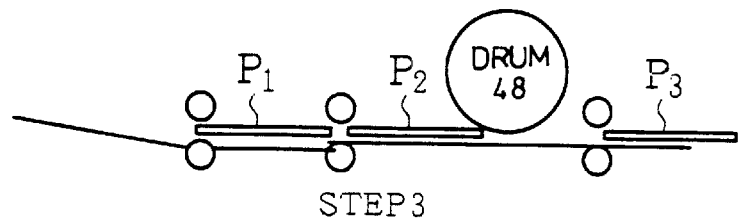
Figure 33D:
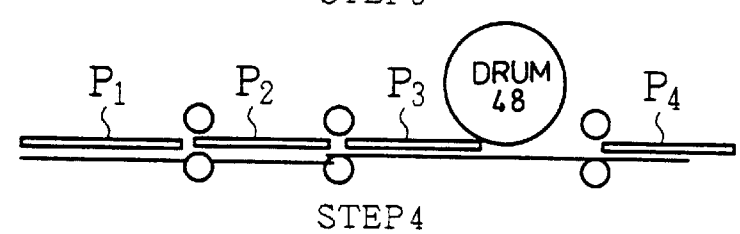
Figure 33E:
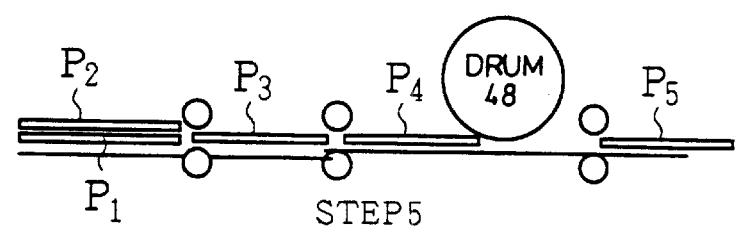
Figure 33F:
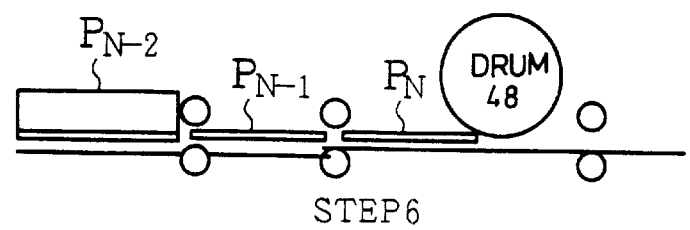

Note that in the flowchart of FIG. 32 the processing operation of S101 through S105 and S107 through S111 is a processing operation in the duplex recording mode like the processing operation of S71 through S75 and S77 through S81 in the aforementioned flowchart of FIG. 23. Therefore, only a case where the duplex recording mode is not instructed is explained here.

In the case where the sheet binding mode is set, the output of read-in image and discharge of image-recorded sheets are performed in a manner such that input of image data is paused if input of image data exceeds the limit of capacity of the stapling device even when further input is permitted as a result of check of the capacity of the hard disk device 503.

The following description concretely depicts this case, assuming that the hard disk device 503 has a capacity of 100 pages and the stapling device has a limit of 25 sheets.

When an image for page 25 is inputted, whether or not the hard disk device 503 has enough room for the next input is checked at S106. In the case where the hard disk device 503 has enough room, the amount of data to be inputted next is compared with the limit of the stapling device (S113). Since the limit is 25 pages here, the next input is not conducted (the flow does not return to S101), and the discharge operation starts (S115).

Here, by setting whether or not priority is imparted to the stapling, it is judged at S114 whether or not priority is imparted to the stapling, and if not, without performing the judgment relating to the limit in stapling, the flow returns to S101. Only when the capacity of the hard disk device 503 is judged to be insufficient, the discharge operation is performed at S115.

In the case where the stapling is instructed and sheets are sequentially discharged while sheets are supplied, the discharge of sheets is temporarily suspended after the judgments at S113 and S114, and the stapling operation by the post-processing device 34 is performed.

FIGS. 33(*a*) through 33(*f*) show the transport of sheets in this case.

A sheet of paper P1 is first fed in as shown in FIG. 33(*a*). The feed of sheets is performed when the input of sheets is permitted. Next, the judgement shown in the foregoing flowchart is performed based on the amount of image data and the number of sheets as a limit, and when the input is permitted, the state shifts to a state of STEP 2 shown in FIG. 33(*b*). The same operation is repeated, and, in the case where the stapling is performed according to the last judgment and in the case where the limit in stapling is N sheets, when the input is judged to exceed the limit in stapling at the judgement after input of image data for the N−1'th sheet, the input of data and the feed of sheets are suspended after the input of data for the N'th sheet. When the transport of sheets is finished, the stapling operation starts (see FIG. 33(*f*)).

Figure 34:
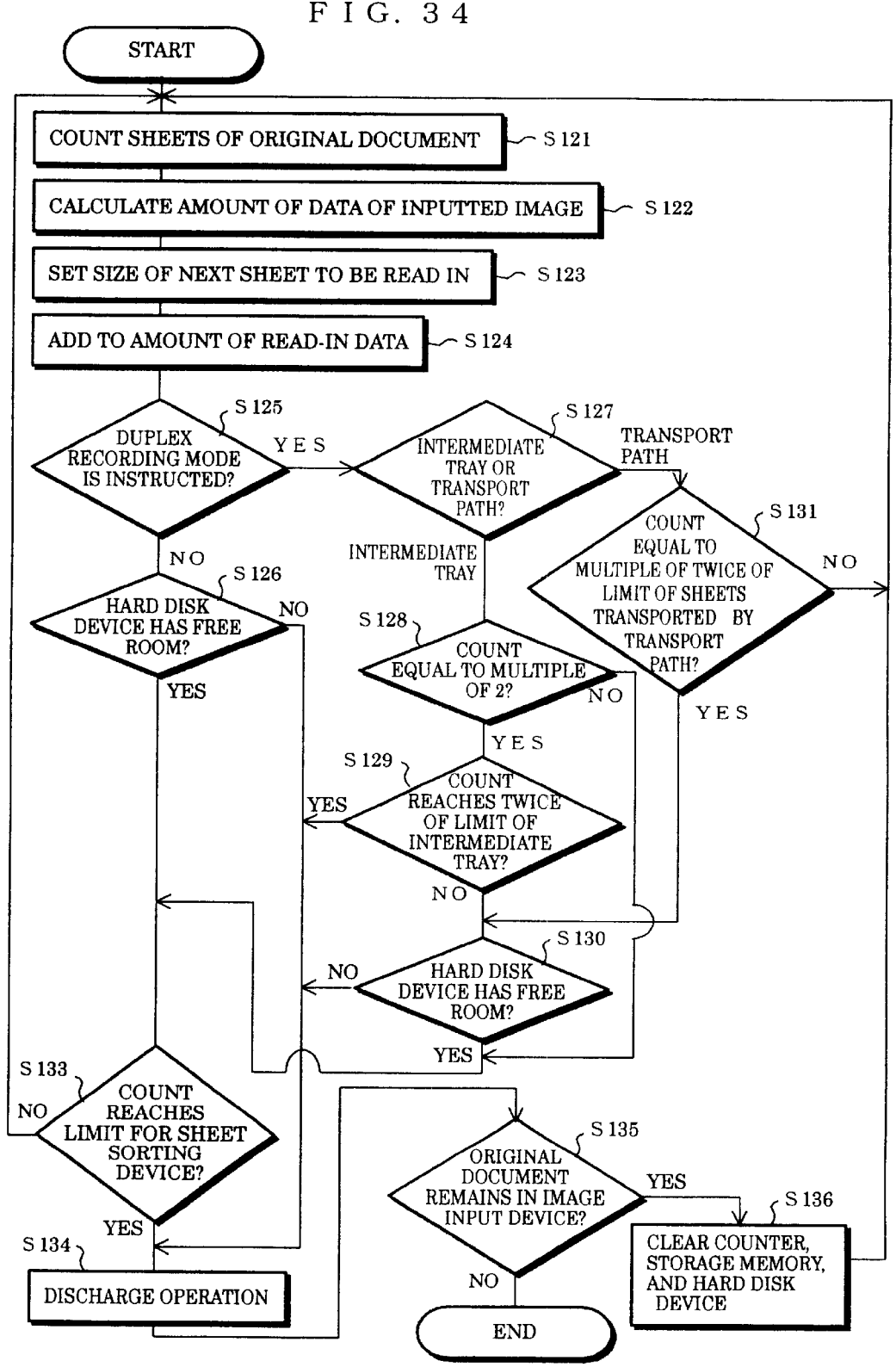
FIG. 34 is a flowchart of a judging operation in the plural-block split processing in the case where a sheet sorting mode is instructed.

The following description relates to the sheet sorting mode and the plural-block split processing, which are performed as shown in the flowchart of FIG. 34.

Incidentally, the flowchart of FIG. 34, for sorting of discharged sheets, is the same as the flowchart of FIG. 32 except that judgment at S133 on whether or not the amount of input data reaches the limit number of sheets of the sheet sorting device is performed instead of the judgment at S113 relating to the limit number of sheets in stapling (S114 is omitted). The sorting mode is a mode in which the read data are outputted to a multiple-copy sorting device, in the order in which the data are read.

The following description will explain division into blocks in the case where a mode (N-in-1 mode) in which a plurality of images are recorded as one image on a recording material is instructed.

Figure 35:
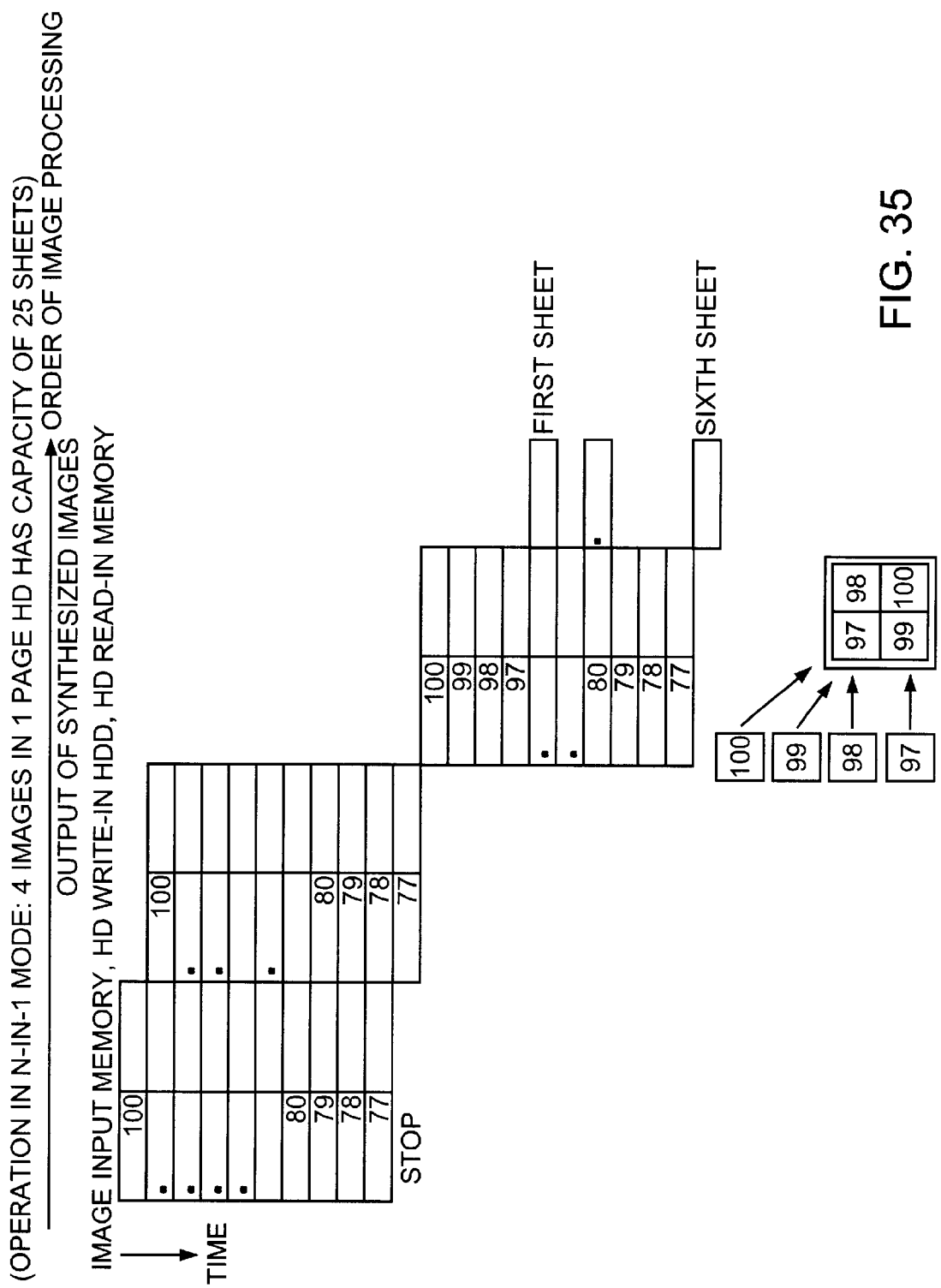
FIG. 35 is a view showing an image processing operation in the case where an N-in-1 mode is instructed.

The foregoing mode is realized by setting timings of the operation as shown in FIG. 35.

To explain this, output of data and discharge of image-recorded sheet is performed by a batch operation in which images are once stored in the hard disk device 503 and thereafter outputted.

Here, the timings of reading images into the hard disk device 503 are such that images are stored in the hard disk device 503 immediately after the images are inputted, and judgment on whether or not input is permitted is made by judging the capacity of the hard disk device 503 in the N-in-1 mode before the image data are transferred to the hard disk device 503.

The judgment process is as shown in the flowchart of FIG. 36. In the flowchart of FIG. 36, the operation of S141 through S144, S145, and S147 through S151 is the same operation in the duplex recording mode as that of S71 through S75 and S77 through S81 in the flowchart of FIG. 23. Therefore, only the case where the duplex recording mode is not instructed will be explained.

Upon input of an original document, N, which in the N-in-1 mode designates the number of images allocated in one surface of a sheet, is used in judgment regarding division of image data into blocks upon storage of the same in the hard disk device 503.

First of all, when images are inputted, whether or not the hard disk device 503 will still have room after data of N images for the first sheet to be outputted are stored is judged, and if it will, the input of data for the N+1'th sheet of the original document. If it will not, after read-in of the N images is completed, the flow proceeds to S153, at which the input of the original document is suspended and the image data in the hard disk device 503 are outputted. With this, in the case where the N-in-1 mode is instructed, complete copies of the original document are obtained even in the case where the plural-block split processing is instructed in the N-in-1 mode.

As has been described above, a first image output processing apparatus of the present invention, which includes storing means and temporarily stores inputted image data in the storing means and thereafter reads out the same therefrom so as to output images on sheets of paper, is characterized by including image output controlling means, which (i) divides inputted image data into a plurality of blocks under predetermined conditions in an order in which the image data are inputted so that one block has an amount of image data not exceeding a capacity of the storing means, (ii) when the storing of image data of one block in the storing means is finished, reads out the temporarily stored image data from the storing means, outputs the image data of the block so that a set number of copies of the images are obtained, and makes the storing means free, and (iii) thereafter stores image data of a next block into the storing means and applies to the image data the same processing operation as that described above.

A second image output processing apparatus of the present invention is the first image output processing apparatus further characterized in that the image output controlling means divides image data into blocks referring to the capacity of the storing means.

According to the foregoing arrangement, in the case where massive image data are transferred from a networked personal computer or the like or in the case where a massive document is set in an automatic document reading device (image input device), image data can be divided into blocks under predetermined conditions in an order in which the image data are inputted, and image data of each block are outputted so that a desired number of copies of the same are obtained.

The foregoing arrangement wherein inputted data are divided into blocks according to a capacity of storing means enables output of image data for required plural copies even when an amount of inputted image data exceeds the capacity of the storing means, and required plural copies of the document can be surely obtained with a subsequent editing operation, without a sorting function.

A third image output processing apparatus of the present invention is the second image output processing apparatus further characterized by further including discharging means capable of switching between face-up discharge in which the sheets of paper are sequentially piled with image-recorded surfaces thereof facing upward, and face-down discharge in which the sheets of paper are sequentially piled with image-recorded surfaces thereof facing downward, wherein, in the case where images are divided into blocks and outputted, the image output controlling means reads out image data from the storing means in a page order, and the discharging means discharges the sheets of paper in the face-down state.

According to the foregoing arrangement, in the case where such massive data as have to be divided into blocks are inputted, the face-down discharge is performed, in which discharged sheets need not be rearranged sheet by sheet, thereby making the subsequent editing work easier. In the case where production of only one copy is instructed, particularly achieved is an effect that a copy of the original document can be obtained by simply putting a set of sheets of paper on another set in an order in which the sets are discharged.

A fourth image output processing apparatus of the present invention is the third image output processing apparatus further characterized in that, in the case where images are outputted without being divided into blocks, the image output controlling means reads out image data from the storing means in a reverse page order, and the discharging means discharges the sheets of paper in the face-up state.

According to the foregoing arrangement, if an amount of image data is to a limit of the capacity of the storing means, the image data are read out in the reverse page order and discharged in the face-up state. Therefore, rearrangement of pages is unnecessary, and moreover, switchback transport is unnecessary, thereby hardly causing paper jamming, and making spent time shorter.

A fifth image output processing apparatus of the present invention is the foregoing first image output processing apparatus further characterized in that output conditions of outputted images are instructed, the image output controlling means divides the image data into, blocks in accordance with the output conditions.

With the foregoing arrangement wherein borders with which the image data are divided into blocks are set in accordance with, not only the capacity of the storing means, but also output conditions of outputted images, copies of a document in accordance with the output conditions can be obtained after editing.

A sixth image output processing apparatus of the present invention is the fifth image output processing apparatus further characterized in that, in the case where a duplex recording mode is instructed as output conditions, the image data are divided into blocks so that image data to be recorded on a front surface and a back surface of a same sheet of paper are not separately allocated to different blocks.

With the foregoing arrangement wherein, in the duplex recording mode, the image data are divided into blocks so that image data to be recorded on front and back surfaces of a same sheet of paper are not separately allocated to different blocks, hardly occurs such a defect that one surface of a sheet of paper on a border between blocks becomes blank. Accordingly, copies of a document can be obtained in the double-sided form without problems from image data divided into a plurality of blocks.

A seventh image output processing apparatus of the present invention is the foregoing sixth image output processing apparatus further characterized in that, in the case where, in the duplex recording mode, sheets of paper having images recorded on first surfaces thereof are temporarily held in an intermediate tray, the image data are divided into blocks so that one block contains image data equivalent to twice a maximum number of sheets of paper loaded on the intermediate tray.

With the foregoing arrangement wherein the image data are divided into blocks so that one block contains image data equivalent to twice a maximum number of sheets of paper loaded on the intermediate tray, copies of a document can be obtained in the double-sided form without problems from image data divided into a plurality of blocks, in the duplex recording operation with use of the duplex unit of the intermediate tray type.

An eighth image output processing apparatus of the present invention is the foregoing sixth image output processing apparatus further characterized in that, in the case where, in the duplex recording mode, to form images on second surfaces of the sheets of paper which have images on first surfaces thereof, the sheets of paper are not piled but are recirculated with a predetermined number of sheets of paper being treated as one transport unit, the image data are divided into blocks so that one block contains image data equivalent to twice the transport unit, the predetermined number depending on a length of a transport path and a size of the paper.

With the foregoing arrangement wherein the image data are divided into blocks so that one block contains image data equivalent to twice the transport unit, copies of a document can be obtained in the double-sided form without problems from image data divided into a plurality of blocks, in the duplex recording operation with use of the duplex unit of a recirculation type which does not use the intermediate tray.

A ninth image output processing apparatus of the present invention is any one of the foregoing first through eighth image output processing apparatus further characterized by further including border expressing means for making each border between the blocks appear more clearly, so that each border between the blocks is more distinct.

With the foregoing arrangement wherein the border expressing means makes borders between blocks explicit, each border between blocks is clear to the user at a glance, thereby enabling the user to easily work on editing, and hence, improving the workability.

A tenth image output processing apparatus of the present invention is the foregoing ninth image output processing apparatus further characterized in that the border expressing means is offset means for shifting a discharge position of discharged sheets of paper, and that the offset means makes a shift of a discharge position of a set of sheets of paper in one block from a discharge position of an adjacent set in an adjacent block greater than a shift of a discharge position of a set of sheets of paper from a discharge position of an adjacent set in a same block.

With the foregoing arrangement wherein borders between blocks are made more explicit with a greater offset of a discharge position than that to express a border between sets of sheets of paper in the same block, each border between blocks is clear to the user at a glance, thereby enabling the user to easily work on editing, and hence, improving the workability.

An eleventh image output processing apparatus of the present invention is the foregoing ninth image output processing apparatus further characterized in that the boarder expressing means is distinction sheet discharging means for inserting a sheet of distinction paper between adjacent sets of sheets of paper in respective adjacent different blocks, the distinction paper having different characteristics from those of the sets of sheets of paper.

With the foregoing arrangement wherein each border between blocks is indicated by a sheet of the distinction paper having different characteristics, each border is clear to the user at a glance, thereby enabling the user to easily work on editing, and hence, improving the workability.

A twelfth image output processing apparatus of the present invention is any one of the foregoing first through eleventh image output processing apparatus further characterized by further including editing information outputting means for outputting editing information used for finishing discharged sheets of paper divided in groups into complete copies are outputted.

With the foregoing arrangement, when images are outputted by dividing image data into blocks, the editing information outputting means outputs editing information for finishing the discharged sheets of paper divided in groups into complete copies, and the user only has to rearrange the groups of discharged sheets of paper in accordance with the outputted editing information. By so doing, the user can easily and speedily finish the editing work.

A thirteenth image output processing apparatus of the present invention is the foregoing twelfth image output processing apparatus further characterized in that the editing information outputting means provides editing information in a manner instructed by a user.

With this arrangement, the user is allowed to instruct the manner of providing the editing information, and the editing information outputting means provides the editing information in the manner thus instructed. Therefore, in the case where the user works on editing at a distance from the image outputting processing apparatus, the user may instruct the editing information provision by printing out. On the other hand, in the case where the user can quickly carry out the editing beside the image output processing apparatus, the editing information may be displayed on the display section of the image output processing apparatus, so that paper and toner are not wasted.

A fourteenth image output processing apparatus of the present invention is the foregoing twelfth image output processing apparatus further characterized in that the editing information outputting means has editing information at various levels, and provides editing information at a level instructed by the user.

With the foregoing arrangement, the user is allowed to instruct the level of editing information to be provided, and the editing information output means provides editing information at the instructed level. Therefore, it is possible to provide editing information suitable to the level of the user's skill of editing work, for example, detailed editing information for a user not accustomed to an editing work, while simplified editing information for a user accustomed to an editing work.

A fifteenth image output processing apparatus of the present invention is the foregoing twelfth image output processing apparatus further characterized in that the foregoing editing information outputting means suspends output of editing information in response to an instruction by the user for non-necessity of output of editing information.

With the foregoing arrangement, the user is allowed to instruct necessity/non-necessity of output of editing information. Therefore, the user well versed in the editing work may instruct non-necessity of output of editing information, so as to avoid such bother as display of editing information every time or request to the user for instruction of the displaying manner.

A sixteenth image output processing apparatus of the present invention is the foregoing twelfth image output processing apparatus further characterized in that the foregoing editing information outputting means outputs editing information on a sheet of distinction paper at a position such that an image of the editing information is not hidden under sheets of paper subsequently piled on the sheet of distinction paper.

Since the foregoing arrangement ensures that the image of the editing information is outputted at a position such that it is not hidden under sheets of paper subsequently piled on the sheet of distinction paper, it is possible to check the editing information before starting to edit the sets of sheets, allowing a user unaccustomed to such editing works to work at ease.

A seventeenth image output processing apparatus of the present invention is the foregoing twelfth image output processing apparatus further characterized in that the foregoing editing information outputting means is arranged so that, in the case where the sheets of paper are discharged in a face-down state in which the sheets of paper are piled with image-recorded surfaces of the sheets of paper facing downward, the editing information outputting means outputs editing information on both surfaces of the sheet of distinction paper so that the surfaces have respective editing information suited with respective states of the sheets of paper in an editing operation.

The sheets of paper discharged in the face-down state are, since blank surfaces thereof face upward, sometimes turned over so that image-recorded surfaces face upward. Therefore, by causing the image output processing apparatus to output editing information on both surfaces of the sheet of distinction paper so that the surfaces have respective editing information suited with respective states of the sheets of paper in an editing operation, the person engaged in the editing work can carry out the editing work without difficulty, if the pile of sheets of paper is turned over.

An eighteenth image output processing apparatus of the present invention is any one of the foregoing first through seventeenth image output processing apparatuses further characterized by further including plural-block split history managing means for managing, as history information, history of output of image data which are divided into blocks.

With the foregoing arrangement wherein the plural-block split history managing means manages history of output of images in blocks as history information, a service man can refer to an outcome of the management and recommend the user to extend the storing means in the case where, for example, frequency of use of the plural-block split processing mode is high. Thus, provision of information for improvement of working efficiency for the user is enabled.

A nineteenth image output processing apparatus of the present invention is the eighteenth image output processing apparatus further characterized by further including option information outputting means for outputting option information for facilitating an editing operation by decreasing blocks in number, based on an outcome of management by the plural-block split history managing means.

According to the foregoing arrangement, based on the outcome of management of the plural-block split history managing means, the option information outputting means outputs option information for facilitating the editing work by decreasing the number of blocks. This enables the user to easily obtain information for improving working efficiency, thereby further improving the working efficiency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image output processing apparatus which temporarily stores inputted image data and thereafter reads out the same so as to output images on sheets of paper, said image output processing apparatus comprising:

storing means for storing image data; and image output controlling means, which (i) divides inputted image data into a plurality of blocks under predetermined conditions in an order in which the image data are inputted so that one block has an amount of image data not exceeding a capacity of said storing means, (ii) when the storing of image data of one block in said storing means is finished, reads out the temporarily stored image data from said storing means, outputs the image data of the block so that a set number of copies of the images are obtained, and makes said storing means free, and (iii) thereafter stores image data of a next block into said storing means and applies to the image data the same processing operation as that described above.

2. The image output processing apparatus set forth in claim 1, wherein said image output controlling means divides image data into blocks referring to the capacity of said storing means.

3. The image output processing device set forth in claim 1, further comprising:

discharging means capable of discharging the sheets of paper in a face-up state in which the sheets of paper are piled with image-recorded surfaces of the sheets of paper facing upward, wherein:

in the case where images are outputted without being divided into blocks, said image output controlling means reads out image data from said storing means in a reverse page order, and said discharging means discharges the sheets of paper in the face-up state.

4. The image output processing apparatus set forth in claim 1, further comprising:

plural-block slit history managing means for managing, as history information, history of output of image data which are divided into blocks.

5. The image output processing apparatus set forth in claim 4, further comprising:

option information outputting means for outputting option information for simplifying an editing operation by decreasing blocks in number, based on an outcome of management by said plural-block split history managing means.

6. The image output processing apparatus set forth in claim 1, further comprising:

discharging means capable of discharging the sheets of paper in a face-down state in which the sheets of paper are piled with image-recorded surfaces of the sheets of paper facing downward, wherein:

in the case where images are divided into blocks and outputted, said image output controlling means reads out image data from said storing means in a page order, and said discharging means discharges the sheets of paper in the face-down state.

7. The image output processing apparatus set forth in claim 6, wherein:

said discharging means is capable of switching between face-up discharge in which the sheets of paper are sequentially piled with image-recorded surfaces thereof facing upward, and face-down discharge in which the sheets of paper are sequentially piled with image-recorded surfaces thereof facing downward; and in the case where images are outputted without being divided into blocks, said image output controlling means reads out image data from said storing means in a reverse page order, and said discharging means performs face-up discharge.

8. The image output processing apparatus set forth in claim 1, wherein:

in the case where output conditions of outputted images are instructed, said image output controlling means divides the image data into blocks in accordance with the conditions.

9. The image output processing apparatus set forth in claim 8, wherein:

in the case where a duplex recording mode is instructed as output conditions, the image data are divided into blocks so that image data to be recorded on a front surface and a back surface of a same sheet of paper are not separately allocated to different blocks.

10. The image output processing apparatus set forth in claim 9, wherein:

in the duplex recording mode, in the case where sheets of paper having images recorded on first surfaces thereof are temporarily held in an intermediate tray, the image data are divided into blocks so that one block contains image data equivalent to twice a maximum number of sheets of paper loaded on said intermediate tray.

11. The image output processing apparatus set forth in claim 9, wherein:

in the duplex recording mode, in the case where, to form images on second surfaces of the sheets of paper which have images on first surfaces thereof, the sheets of paper are not piled but are recirculated with a predetermined number of sheets of paper being treated as one transport unit, the image data are divided into blocks so that one block contains image data equivalent to twice the transport unit, the predetermined number depending on a length of a transport path and a size of the paper.

12. The image output processing apparatus set forth in claim 1, further comprising border expressing means for making each border between the blocks appear more clearly, so that each border between the blocks is more distinct.

13. The image output processing apparatus set forth in claim 12, wherein:

said border expressing means is offset means for shifting a discharge position of discharged sheets of paper.

14. The image output processing apparatus set forth in claim 13, wherein:

said offset means makes a greater shift of a discharge position of a set of sheets of paper in one block from a discharge position of an adjacent set in an adjacent block, as compared with a shift of a discharge position of a set of sheets of paper from a discharge position of an adjacent set in a same block.

15. The image output processing apparatus set forth in claim 12, wherein:

said border expressing means is distinction sheet discharging means for inserting a sheet of distinction paper between adjacent sets of sheets of paper respectively in adjacent different blocks, said distinction paper having different characteristics from those of the sets of sheets of paper.

16. The image output processing apparatus set forth in claim 1, further comprising:

editing information outputting means for outputting editing information used for finishing discharged sheets of paper divided in groups into complete copies are outputted.

17. The image output processing apparatus set forth in claim 16, wherein:

said editing information outputting means provides editing information in a manner instructed by a user.

18. The image output processing apparatus set forth in claim 16, wherein:

said editing information outputting means has editing information at various levels, and provides editing information at a level instructed by the user.

19. The image output processing apparatus set forth in claim 16, wherein:

said editing information outputting means suspends output of editing information in response to an instruction by the user for non-necessity of output of editing information.

20. The image output processing apparatus set forth in claim 16, wherein said editing information outputting means outputs editing information on a sheet of distinction paper at a position such that an image of the editing information is not hidden under sheets of paper subsequently piled on the sheet of distinction paper.

21. The image output processing apparatus set forth in claim 16, wherein:

in the case where the sheets of paper are discharged in a face-down state in which the sheets of paper are piled with image-recorded surfaces of the sheets of paper facing downward, said editing information outputting means outputs editing information on both surfaces of the sheet of distinction paper so that the surfaces have respective editing information suited with respective states of the sheets of paper in an editing operation.

* * * * *